(12) United States Patent
Higuchi

(10) Patent No.: US 6,310,842 B1
(45) Date of Patent: Oct. 30, 2001

(54) RECORDING APPARATUS AND RECORDING METHOD

(75) Inventor: Satoshi Higuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/596,619

(22) Filed: Jun. 19, 2000

(30) Foreign Application Priority Data

Jun. 30, 1999 (JP) .................................................. 11-185135
Jul. 28, 1999 (JP) .................................................. 11-213840

(51) Int. Cl.⁷ .................................................. G11B 7/00
(52) U.S. Cl. .................................... 369/47.15; 369/47.16; 369/53.37; 369/53.45
(58) Field of Search ................................ 369/47.1, 47.15, 369/47.16, 47.19, 47.2, 47.23, 53.1, 53.31, 53.37, 53.41, 53.44, 53.45, 59.1, 59.14

(56) References Cited

U.S. PATENT DOCUMENTS 5,177,728 * 1/1993 Otsubo et al. ..................... 369/47.24
5,684,763 * 11/1997 Kurita et al. .................. 369/53.37 X

* cited by examiner

Primary Examiner—Muhammad Edun
(74) Attorney, Agent, or Firm—Oblon, Spivak, McClelland, Maier & Neustadt, P.C.

(57) ABSTRACT

The invention provides a recording apparatus for recording a signal such onto a recording medium by which a long recordable time for the recording medium can be assured. The recording apparatus includes a recording section for recording a signal onto a recording medium in accordance with one of recording modes selected from within a plurality of recording modes, a signal discrimination section for discriminating a signal state of the signal, and a changeover control section for changing over the recording mode of the recording section in response to a result of the discrimination by the signal discrimination section.

18 Claims, 11 Drawing Sheets

FIG. 3

| | 16 bit | | 16 bit | | |
|---|---|---|---|---|---|
| | MSB  LSB | MSB  LSB | MSB  LSB | MSB  LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster H | Cluster L | Sector | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| CTID | 00000000 | 00000000 | 00000000 | 00000000 | 9 |
| OANA | 00000000 | 00000000 | 00000000 | Disc Serial No. | 10 |
| RBDT | Disc | ID | P-DFA | P-EMPTY | 11 |
| RLIA | P-FRA | P-TNO1 | P-TNO2 | P-TNO3 | 12 |
| EEC | P-TNO4 | P-TNO5 | P-TNO6 | P-TNO7 | 13 |
| SPAS | | | | | |
| PTE | | | | | |
| OIC | | | | | |
| NOT | | | | | |
| DNI | P-TNO248 | P-TNO249 | P-TNO250 | P-TNO251 | 74 |
| EN | P-TNO252 | P-TNO253 | P-TNO254 | P-TNO255 | 75 |
| NC | 00000000 | 00000000 | 00000000 | 00000000 | 76 |
| CE | 00000000 | 00000000 | 00000000 | 00000000 | 77 |
| | (01h) START ADDRESS | | | TRACK MODE | 78 |
| | END ADDRESS | | | LINK INFORMATION | 79 |
| | (02h) START ADDRESS | | | TRACK MODE | 80 |
| | END ADDRESS | | | LINK INFORMATION | 81 |
| | (03h) START ADDRESS | | | TRACK MODE | 82 |
| MT | END ADDRESS | | | LINK INFORMATION | 83 |
| AA(2 | | | | | |
| NB5 | | | | | |
| AL5 | | | | | |
| GE S | | | | | |
| E L | (FCh) START ADDRESS | | | TRACK MODE | 580 |
| MS O | END ADDRESS | | | LINK INFORMATION | 581 |
| EE T | (FDh) START ADDRESS | | | TRACK MODE | 582 |
| NC S | END ADDRESS | | | LINK INFORMATION | 583 |
| TT ) | (FEh) START ADDRESS | | | TRACK MODE | 584 |
| I | END ADDRESS | | | LINK INFORMATION | 585 |
| O | (FFh) START ADDRESS | | | TRACK MODE | 586 |
| N | END ADDRESS | | | LINK INFORMATION | 587 |

U-TOC SECTOR 0

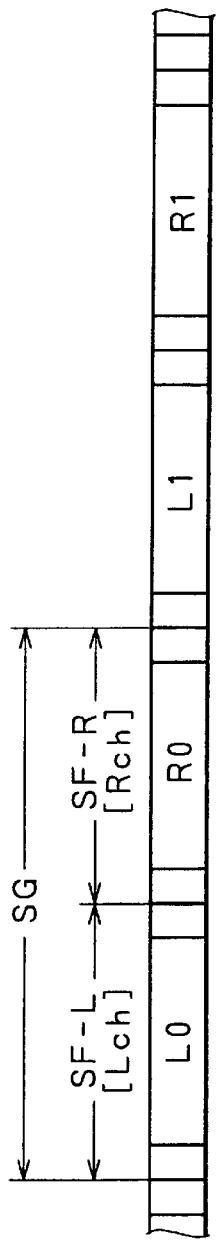
FIG. 5A RECORDING OF STEREO DATA IN STEREO RECORDING MODE
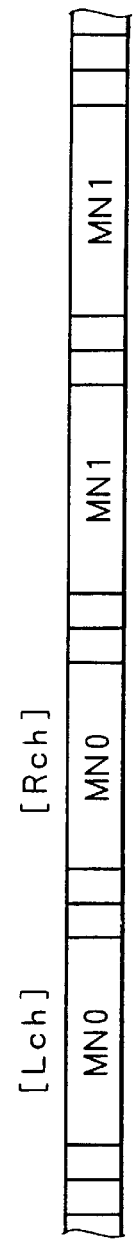
FIG. 5B RECORDING OF MONAURAL DATA IN STEREO RECORDING MODE
FIG. 5C MONAURAL RECORDING MODE

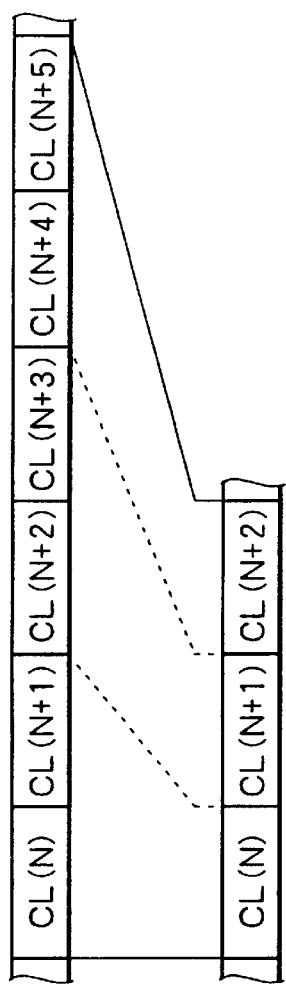
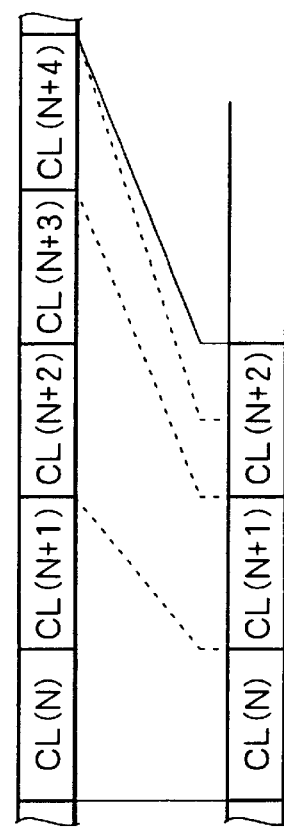
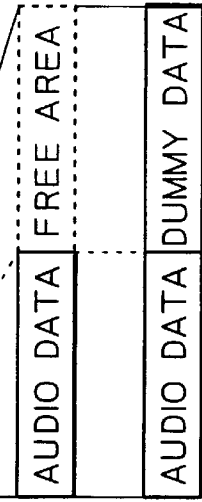
FIG. 6A  STEREO RECORDING MODE
FIG. 6B  MONAURAL RECORDING MODE
FIG. 6C  STEREO RECORDING MODE
FIG. 6D  MONAURAL RECORDING MODE
FIG. 6E
FIG. 6F

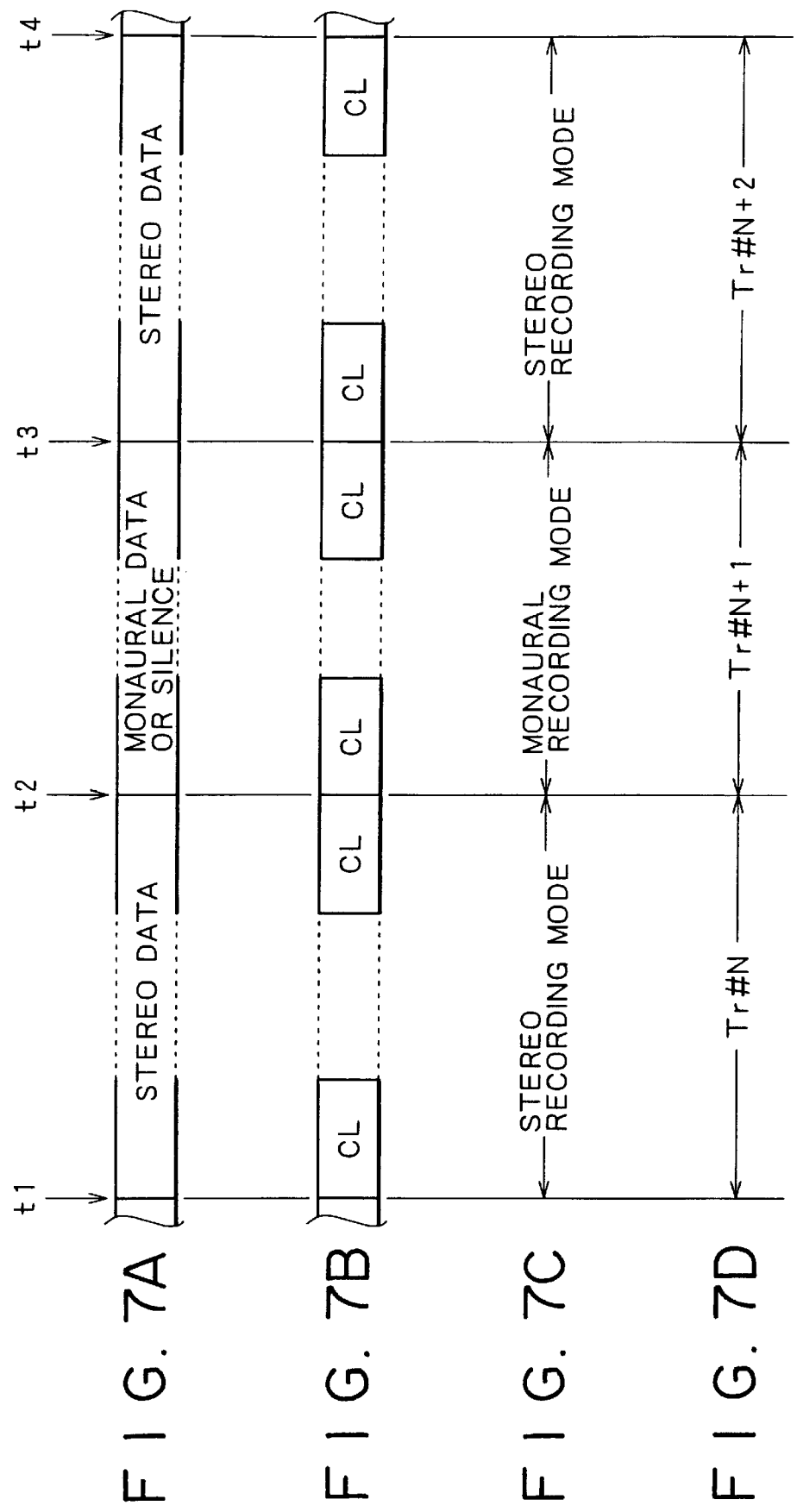

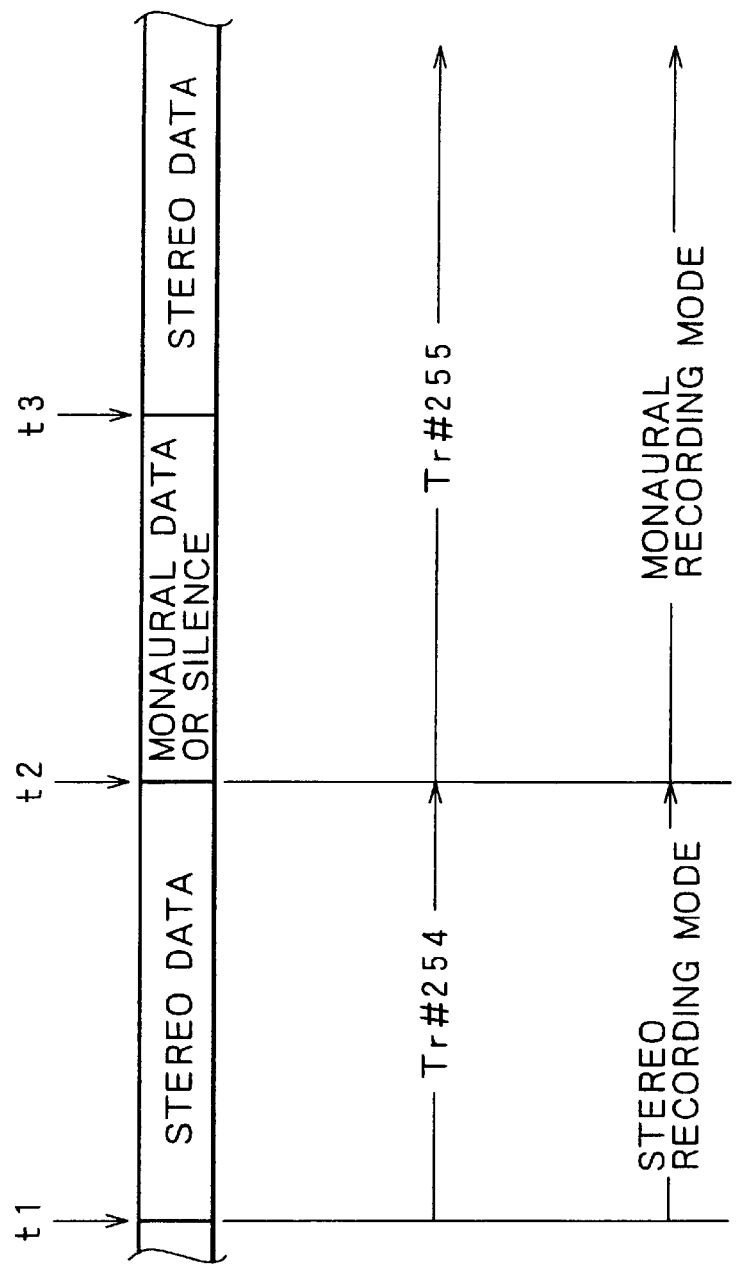

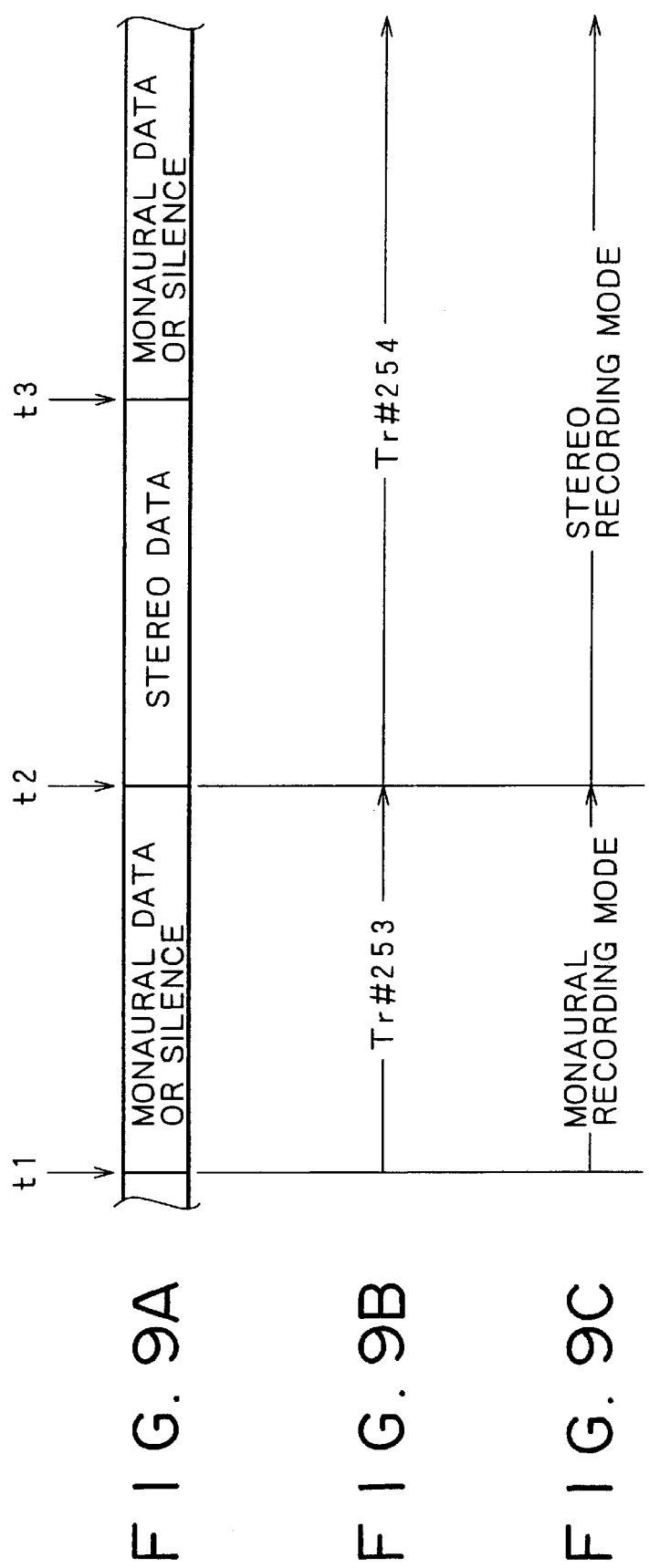

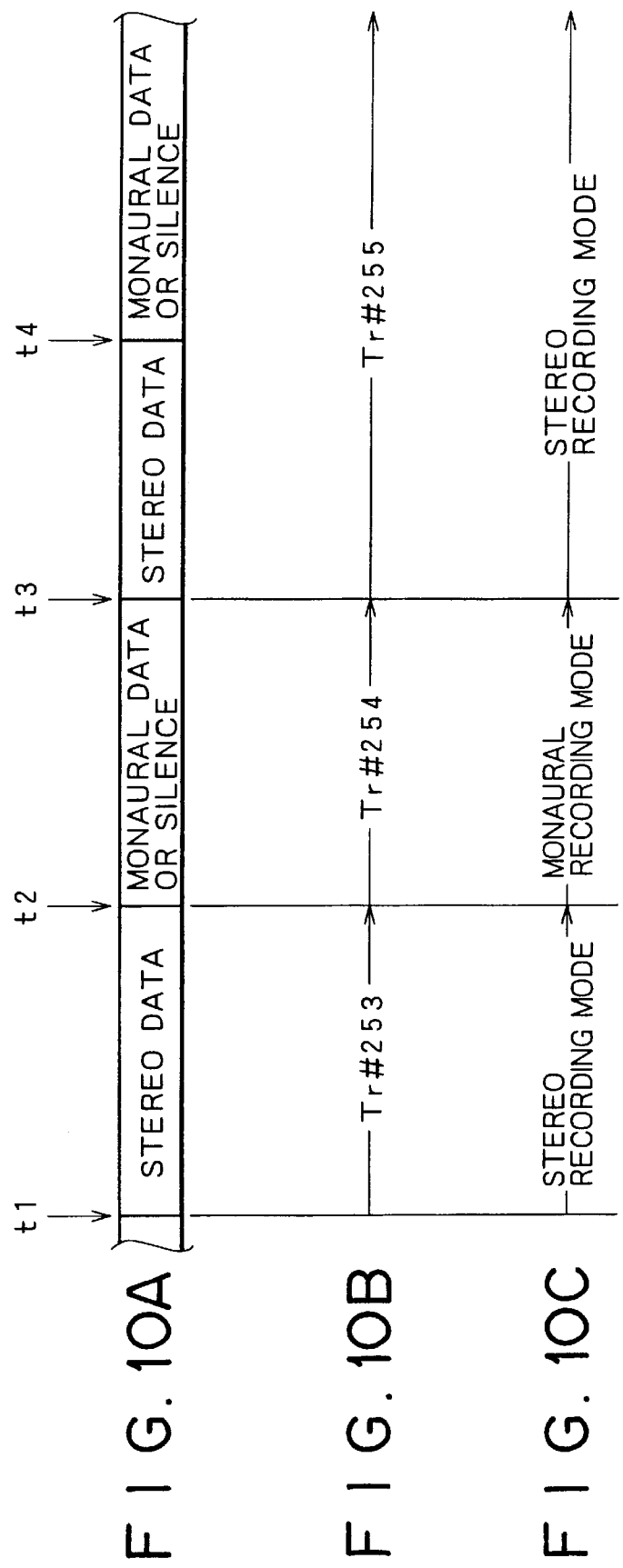

RECORDING APPARATUS AND RECORDING METHOD

BACKGROUND OF THE INVENTION

This invention relates to a recording apparatus which can record a signal such as, for example, an audio signal inputted thereto onto a recording medium.

In recent years, disk media onto and from which audio data can be recorded and reproduced such as, for example, a mini disk (MD, trademark) and recording and reproduction apparatus on which such disk media can be used have been popularized widely.

In such a MD recorder/player as just mentioned, a user can obtain an audio library arbitrarily by recording, for example, an audio signal reproduced by an audio apparatus such as a compact disk (CD) player or an audio signal outputted from a radio set onto a MD.

In a digital audio system such as a MD recorder/player as described above, audio data are usually managed in a unit called "program". Here, a program in the present specification signifies a set of data which are managed and recorded in a unit on a disk, and for example, with regard to audio data, it corresponds to one tune (generally called "track") or the like. Therefore, in the following description, a program may suitably be referred to as track.

As audio signals in general music applications, audio signals of the 2-channel stereo system and the monaural system are used frequently.

In digital data recording, when audio data of the stereo system are encoded into recording data to be recorded onto a recording medium, a formatter stream is formed and recorded such that it may be a data stream which includes L-channel data and R-channel data arranged time-divisionally therein.

In recent years, a MD recorder/player has been developed wherein it can execute monaural recording on the premise that it can record L and R stereo audio data having the data structure described above. In monaural recording, for example, an audio signal inputted as a signal of a single channel is successively placed into sound frames of L channel data and R channel data to form a data stream. The data stream obtained in this manner has a data amount equal to ½ that upon stereo recording, and therefore, a recordable time equal to twice that by stereo recording can be obtained with the same recording medium. For example, with regard to a MD recorder/player, while a mini disc which allows recording for 74 minutes has been placed on the market, monaural recording makes it possible to perform recording of the mini disk for 148(=74×2) minutes.

Among mini discs placed on the market as described above, a mini disk of the type which has a recording capacity for recording of stereo data for 74 minutes has been popularized widely. This corresponds to the fact that the maximum recordable time of, for example, a CD is nominally 74 minutes, and the mini disk of the type described is designed so that all contents recorded on a CD can be recorded (called dubbing) onto it.

SUMMARY OF THE INVENTION

It is an object of the present invention to provide a recording apparatus and a recording method by which a long recordable time for a recording medium can be assured.

In order to attain the object described above, according to the present invention, there is provided a recording apparatus for recording a signal onto a recording medium, comprising recording means for recording the signal onto the recording medium in accordance with one of recording modes selected from within a plurality of recording modes, signal discrimination means for discriminating a signal state of the signal, and changeover control means for changing over the recording mode of the recording means in response to a result of the discrimination by the signal discrimination means.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a diagrammatic view of the U-TOC sector 0 of the mini disc system in the combination apparatus of FIG. 1;

FIG. 5A is a diagrammatic view showing a recording format in the mini disc system in the combination apparatus of FIG. 1 upon stereo data recording in a stereo recording mode;

FIG. 5B is a diagrammatic view showing another recording format in the mini disc system in the combination apparatus of FIG. 1 upon monaural data recording in the stereo recording mode;

FIG. 5C is a diagrammatic view showing a further recording format in the mini disc system in the combination apparatus of FIG. 1 in a monaural recording mode;

FIG. 6A is a diagrammatic view showing a structure of clusters in the stereo recording mode in the mini disc system in the combination apparatus of FIG. 1 where the total number of clusters is an even number;

FIG. 6B is a diagrammatic view showing a structure of clusters where the audio data of FIG. 6A is recorded in the monaural recording mode;

FIG. 6C is a diagrammatic view showing a structure of clusters in the stereo recording mode in the mini disc system in the combination apparatus of FIG. 1 where the total number of clusters is an odd number;

FIG. 6D is a diagrammatic view showing a structure of clusters where the audio data of FIG. 6C is recorded in the monaural recording mode;

FIG. 6E is a diagrammatic view illustrating a free area appearing in the last cluster shown in FIG. 6D;

FIG. 6F is a diagrammatic view illustrating dummy data placed in the free area of FIG. 6E;

FIG. 7A is a diagrammatic view illustrating a variation of a signal state of an input source to be recorded in the mini disc system in the combination apparatus of FIG. 1;

FIG. 7B is a diagrammatic view illustrating recording of the input source of FIG. 7A performed in a unit of a cluster for each interval in which the recording mode is changed over in response to a signal state;

FIG. 7C is a diagrammatic view illustrating a recording mode when the input source of FIG. 7A is recorded;

FIG. 7D is a diagrammatic view illustrating the number of tracks onto which the input source of FIG. 7A is recorded;

FIG. 8A is a diagrammatic view illustrating a variation (stereo data, monaural data or silence, stereo data) of a signal state of an input source to be recorded in the mini disc system in the combination apparatus of FIG. 1;

FIG. 8B is a diagrammatic view illustrating track numbers corresponding to the input source of FIG. 8A;

FIG. 8C is a diagrammatic view illustrating recording nodes corresponding to the input source of FIG. 8A;

FIG. 9A is a diagrammatic view illustrating a variation (monaural data or silence, stereo data, monaural data or silence) of a signal state of an input source to be recorded in the mini disc system in the combination apparatus of FIG. 1;

FIG. 9B is a diagrammatic view illustrating track numbers corresponding to the input source of FIG. 9A;

FIG. 9C is a diagrammatic views illustrating recording modes corresponding to the input source of FIG. 9A;

FIG. 10A is a diagrammatic view illustrating a variation (stereo data, monaural data or silence, stereo data, monaural data or silence) of a signal state of an input source to be recorded in the mini disc system in the combination apparatus of FIG. 1;

FIG. 10B is a diagrammatic view illustrating track numbers corresponding to the input source of FIG. 10A;

FIG. 10C is a diagrammatic view illustrating recording modes corresponding to the input source of FIG. 10A;

DESCRIPTION OF THE PREFERRED EMBODIMENT

In the following, a preferred embodiment of the present invention is described in detail with reference to the accompanying drawings. A recording apparatus according to the embodiment of the present invention described below is formed as a MD recorder/player which is a recording and reproduction apparatus which can record and play back a MD. The MD recorder/player has a construction as a combination apparatus in which it is integrated with a CD player and a radio set.

Description is given in the following order.
1. Construction of the Combination Apparatus
2. MD Track Format
3. U-TOC
4. Stereo Recording Mode and Monaural Recording Mode
5. Recording Mode Changeover Operation in the Embodiment
   5-1. Outline
   5-2. Processing Operation 1. Construction of the Combination Apparatus A construction of the combination apparatus to which the present invention is applied is described first.

Figure 1:
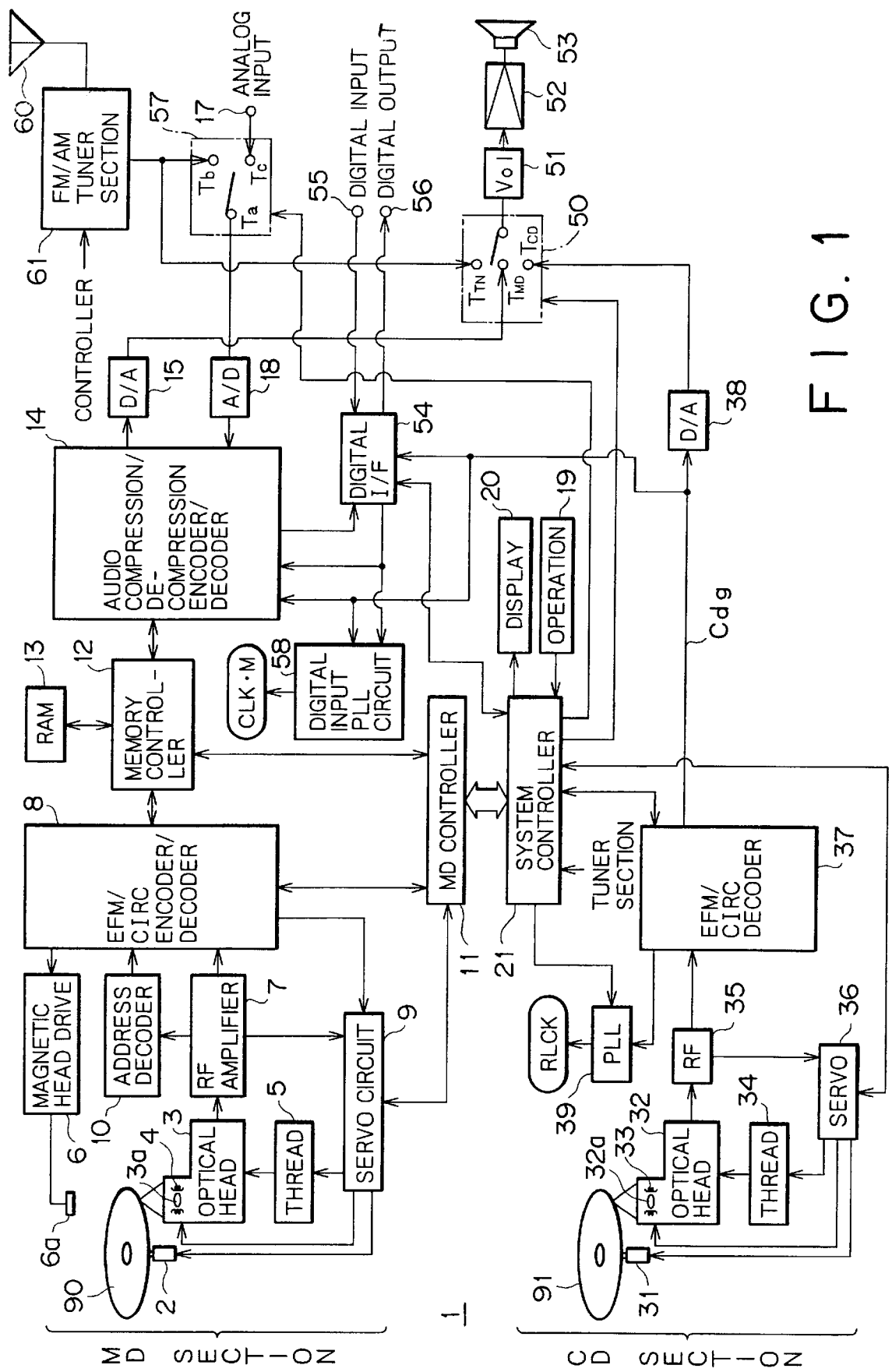
FIG. 1 is a block diagram showing an example of a construction of a combination apparatus including a recording apparatus to which the present invention is applied.

Referring to FIG. 1, a magneto-optical disc (MD) 90 is loaded into a MD section which performs a recording and reproduction operation onto and from a MD.

The MD 90 is used as a medium onto which audio data can be recorded, and is driven to rotate by a spindle motor 2 upon recording/reproduction.

Upon recording/reproduction, an optical head 3 irradiates a laser beam upon the MD 90 as a magneto-optical disc so that it operates as a head upon recording/reproduction. In particular, upon recording, the optical head 3 outputs a laser beam of a high level for heating a recording track to a Curie temperature. However, upon reproduction, the optical head 3 outputs a laser beam of a comparatively low level for detecting data from reflected light from the MD 90 by a magnetic Kerr effect.

To this end, the optical head 3 includes an optical system which in turn includes a laser diode, a polarizing beam splitter, an objective lens 3a and so forth, and a detector for detecting reflected light. The objective lens 3a is supported for displacement in a radial direction of and in a direction toward or away from the MD 90 by a biaxial mechanism 4. Further, the entire optical head 3 is mounted for movement in a radial direction of the MD 90 by a thread mechanism 5.

A magnetic head 6a is disposed in an opposing relationship to the optical head 3 across the MD 90. The magnetic head 6a operates to apply to the MD 90 a magnetic field modulated with data supplied thereto.

The optical head 3 and the magnetic head 6a are supported for movement in a radial direction of the MD 90 by the thread mechanism 5.

Information detected from the MD 90 by the optical head 3 upon reproduction operation is supplied to a RF (radio frequency) amplifier 7. The RF amplifier 7 performs arithmetic processing for the information supplied thereto to extract a reproduction RF signal, a tracking error signal, a focusing error signal, groove information and other necessary information from the information. The groove information is absolute position information recorded as wobbling shapes of grooves which are recorded tracks of the MD 90. The extracted reproduction RF signal is supplied to an encoder/decoder section 8.

Meanwhile, the tracking error signal and the focusing error signal are supplied to a servo circuit 9, and the groove information is supplied to and demodulated by an address decoder 10. Address information decoded from the groove information and address information, sub code information and so forth recorded as data and decoded by the encoder/decoder section 8 are supplied to a MD controller 11 formed from a microcomputer so that they are used for various controls.

It is to be noted that the MD controller 11 functions as a member which executes various operation controls of the MD section.

The servo circuit 9 generates various servo driving signals based on the tracking error signal and the focusing error signal supplied thereto from the RF amplifier 7, a track jump instruction, an access instruction, rotational speed detection information of the spindle motor 2, and so forth from the MD controller 11 to control the biaxial mechanism 4 and the thread mechanism 5 to effect focusing and tracking control and control the spindle motor 2 to rotate at a constant linear velocity (CLV).

The reproduction RF signal is subject to decoding processing such as EFM demodulation and CIRC (Cross Interleave Reed-Solomon Coding) in the encoder/decoder section 8. A resulting signal from the encoder/decoder section 8 is written once into a buffer memory 13 by a memory controller 12. It is to be noted that reading of data from the MD 90 by the optical head 3 and transfer of reproduction data in a system from the optical head 3 to the buffer memory 13 are performed at the rate of 1.41 Mbit/sec and besides intermittently.

The data written in the buffer memory 13 are read out at a timing at which transfer of the reproduction data is performed at the rate of 0.3 Mbit/sec, and are supplied to an audio encoder/decoder section 14. The data supplied to the audio encoder/decoder section 14 are subject to reproduction signal processing such as decoding processing corresponding to audio compression processing so that they are converted into digital audio data sampled with 44.1 KHz and quantized with 16 bits. The digital audio data are converted into an analog signal by a D/A converter 15 and then supplied to a terminal TMD of a switch circuit 50.

Upon reproduction operation for the MD 90, the switch circuit 50 is controlled by a system controller 21, which controls operation of the entire apparatus, so that it may be connected to the terminal TMD. Accordingly, a reproduction audio signal outputted from the audio encoder/decoder section 14 and converted into an analog signal by the D/A converter 15 is supplied through the switch circuit 50 to a sound volume adjustment section 51 and a power amplifier 52 and is outputted as reproduction sound from a speaker 53.

It is to be noted that writing/reading out of data into/from the buffer memory 13 are performed with an address designated by control of a write pointer and a read pointer by the memory controller 12. Since the bit rates upon writing and reading out of the signal into and from the buffer memory 13 are made different from each other as described above, some amount of data is normally stored in the buffer memory 13.

Since a reproduction audio signal is outputted through the buffer memory 13 in this manner, even if tracking of the optical head 3 is brought out of order, for example, by a disturbance, the reproduction audio output is not interrupted. Further, for example, if the optical head 3 accesses a correct tracking position to re-start data reading out while some stored data remains in the buffer memory 13, then the operation is continued without having an influence on the reproduction output. In other words, the vibration withstanding function can be augmented significantly.

The present recording and reproduction apparatus further includes a digital interface 54, and reproduction data decoded by the encoder/decoder section 14 upon reproduction is supplied also to the digital interface 54. The digital interface 54 encodes the received reproduction data into a data stream of a predetermined digital interface format using the reproduction data and sub code information and so forth extracted simultaneously upon reproduction. The data stream is outputted from a digital output terminal 56. The digital interface 54 outputs the encoded data, for example, as an optical digital signal. In other words, the digital interface 54 can output the reproduction data to an external apparatus while the data remain digital data.

An analog audio signal outputted from an external audio apparatus or the like (not shown) is supplied to an analog input terminal 17. The analog input terminal 17 is connected to a terminal Tc of a switch circuit 57.

The switch circuit 57 selects one of an audio signal (connected to another terminal Tb) as radio sound outputted from an FM/AM tuner section 61 which is hereinafter described and another audio signal (connected to the terminal Tc) inputted through the analog input terminal 17. The switch circuit 57 outputs the selected audio signal through a further terminal Tb thereof to an A/D converter 18. The system controller 21 controls the terminal switching operation of the switch circuit 57.

When a recording operation for recording an analog signal inputted onto the MD 90 is to be executed, for example, a recording signal selected by the switch circuit 57, that is, either a radio audio signal or an analog audio signal inputted through the analog input terminal 17, is converted into digital data sampled with 44.1 KHz and quantized with 16 bits by the A/D converter 18. The digital data is supplied to the encoder/decoder section 14. The encoder/decoder section 14 performs audio compression encoding processing for compressing data to approximately ⅕ in amount for the digital data.

Also it is possible to record data fetched through the digital interface 54 onto the MD 90. In particular, a signal supplied to a digital input terminal 55 from an external apparatus, that is, a signal of a digital interface format, is decoded by the digital interface 54 so that audio data, sub codes and so forth are extracted from the signal. The extracted control information such as the sub codes is supplied to the system controller 21, and the audio data as the recording data, that is, the digital da a sampled with 44.1 KHz and quantized with 16 bits, are supplied to the encoder/decoder section 14. The encoder/decoder section 14 performs audio compression encoding processing for compressing data to approximately ⅕ in amount for the digital data.

Furthermore, it is also possible to record audio data reproduced from a CD 91 by a CD section which is hereinafter described onto the MD 90. This is dubbing recording. In this instance, CD reproduction data cdg which are audio data reproduced from the CD 91 and outputted from an EFM/CIRC decoder 37, that is, digital data sampled with the sampling frequency of 44.1 KHz and quantized with 16 bits, are supplied to the encoder/decoder section 14. The encoder/decoder 14 section 14 performs audio compression encoding processing for compressing data to approximately ⅕ in amount for the digital audio data.

A digital input PLL circuit 58 receives the digital audio date inputted through the digital interface 54 or the CD reproduction data cdg outputted from the CD section which is hereinafter described and produces a clock signal CLK·M synchronized with a synchronizing signal or synchronization pattern inserted in the audio data inputted. The clock signal CLK·M has a predetermined frequency equal to a multiple of, for example, fs=44.1 KHz.

The clock signal CLK·M is divided or multiplied into a signal of a required frequency and can be utilized at least as a clock signal for signal processing in the encoder/decoder section 14 and data transfer for inputting to and outputting from the encoder/decoder section 14 upon recording of data inputted in the form of digital data to the MD section.

The recording data compressed by the encoder/decoder section 14 is written once into the buffer memory 13 by the memory controller 12 and then read out at a predetermined timing and sent to the encoder/decoder section 8. Then, the compressed recording data is subject to encoding processing such as CIRC encoding and EFM demodulation by the encoder/decoder section 8 and then supplied to a magnetic head driving circuit 6.

The magnetic head driving circuit 6 supplies a magnetic head driving signal to the magnetic head 6a in response to the thus encoded recording data. In short, the magnetic head driving circuit 6 controls the magnetic head 6a to execute application of a magnetic field of the N or S pole to the MD 90. In this instance, the MD controller 11 supplies a control signal to the optical head 3 so that it may output a laser beam of the recording level.

In order to perform a recording/reproduction operation onto/from the MD 90, management information recorded on the MD 90, that is, the P-TOC (pre-mastered TOC: Table of Contents) and the U-TOC (user TOC), need be read out. The MD controller 11 discriminates an address of an area to be recorded on the MD 90 or an address of an area to be played back based on the management information. The management information is stored into the buffer memory 13. In order to hold the management information, the buffer memory 13 has divisionally set thereon a buffer area for such recording data/reproduction data as described above and an area for storing such management information as mentioned above.

The MD controller 11 reads out the management information by causing a playing back operation of the innermost circumferential side of the MD 90, on which the management information is recorded, to be executed when the MD 90 is loaded into the MD section. The management information read out is stored into the buffer memory 13 so that it can be referred to later upon a recording/reproduction operation onto/from the MD 90.

While the U-TOC is edited and rewritten in response to recording or erasure of data, each time a recording/erasure operation is performed, the MD controller 11 performs such editing processing as mentioned above for the U-TOC information stored in the buffer memory 13 and rewrites the U-TOC area of the MD 90 at a predetermined timing in accordance with the rewriting operation into the buffer memory 13.

The recording and reproduction apparatus further includes a CD section which is a reproduction system for a CD.

A CD 91 which is an optical disk for reproduction only is loaded into the CD section which performs a CD playback operation.

The CD 91 is driven to rotate at a constant linear velocity CLV) by a spindle motor 31 upon reproduction operation. Data recorded in the form of pits on the CD 91 is read out by an optical head 32 and supplied to a RF amplifier 35. In the optical head 32, an objective lens 32a is supported by a biaxial mechanism 33 for displacement in tracking and focusing directions.

Further, the optical head 32 is supported for movement in a radial direction of the CD 91 by a thread mechanism 34.

The RF amplifier 35 produces a reproduction RF signal as well as a focusing error signal and a tracking error signal. The error signals are supplied to a servo circuit 36.

The servo circuit 36 produces various driving signals including a focusing driving signal, a tracking driving signal, a thread driving signal and a spindle driving signal from the focusing error signal and the tracking error signal and controls operation of the biaxial mechanism 33, thread mechanism 34 and spindle motor 31.

The reproduction RF signal is supplied to the decoder 37. The decoder 37 first performs binary digitization of the reproduction RF signal inputted thereto to obtain an EFM signal. Then, the decoder 37 performs EFM demodulation, CIRC decoding and so forth for the EFM signal so that it decodes the information read from the CD 91 into digital audio data sampled with 44.1 KHz and quantized with 16 bits.

The decoder 37 is constructed so that it can extract also control data such as the TOC and sub code data. The TOC and the sub code data extracted by the decoder 37 are supplied to the system controller 21 and used for various controls.

The EFM signal obtained by the binary digitization of the decoder 37 is supplied also to a PLL circuit 39.

The PLL circuit 39 outputs a clock signal PLCK synchronized with channel bits of the EFM signal inputted thereto. The clock signal PLCK has a frequency of 4.3218 MHz in a normal speed operation. The clock signal PLCK is utilized as a clock signal, for example, by a signal processing system beginning with the decoder 37.

The digital audio data outputted from the decoder 37 is converted into an analog audio signal by a D/A converter 38 and supplied to a terminal TCD of the switch circuit 50. Upon playback operation of a CD, the system controller 21 controls the switch circuit 50 to select the terminal TCD so that a reproduction audio signal reproduced from the CD 91 and converted into an analog signal by the D/A converter 38 is supplied to the sound volume adjustment section 51 and the power amplifier 52 through the switch circuit 50 and outputted as reproduction sound from the speaker 53.

Further, in the reproduction and recording apparatus of the present embodiment, reproduction data of a CD can be dubbing recorded onto a MD 90. In this instance, digital audio data outputted from the decoder 37 is supplied as it is to the encoder/decoder section 14.

Also digital audio data outputted from the decoder 37 is supplied to the digital interface 54 so that it can be outputted as CD reproduction data cdg in the form of digital data from the digital output terminal 56 to an external apparatus.

In order to play back the CD 91, the system controller 21 need read out management information recorded on the CD 91, that is, the TOC. The system controller 21 discriminates the number and addresses of tracks recorded on the CD 91 based on the management information and performs reproduction operation control. To this end, the system controller 21 causes a reproduction operation on the innermost circumference side of the CD 91 on which the TOC is recorded to be executed to read out the TOC when the CD 91 is loaded, and stores the read out TOC, for example, into an internal RAM of the system controller 21 so that it may thereafter refer to the TOC upon reproduction operation for the CD 91.

Further, the present combination apparatus includes an FM/AM tuner section 61 as a radio function. The FM/AM tuner section 61 is formed such that it can receive an FM broadcast and an AM broad cast.

The FM/AM tuner section 61 selects one of channels of reception waves received by an antenna 60 and demodulates the selected channel to obtain an audio signal. The audio signal is outputted to the switch circuit 57 and is branched and supplied also to a terminal TIN of the switch circuit 50.

When the combination apparatus is set to a radio mode for reproduction of tuner sound, the system controller 21 controls the switch circuit 50 to select the terminal TIN. Consequently, the audio signal outputted from the FM/AM tuner section 61 is supplied through the switch circuit 50 to the sound volume adjustment section 51 and the power amplifier 52 so that it is outputted as radio sound from the speaker 53.

The channel selection operation of the FM/AM tuner section 61 is controlled by the system controller 21 in accordance with a channel selection instruction inputted by an operation of an operation section 19 which is hereinafter described.

Further, in the recording and reproduction apparatus of the present embodiment, the MD controller 11 detects states of data to be written for storage into the buffer memory 13 by processing of the memory controller 12 upon recording. Such states of data (a signal) to be detected include whether or not the data exhibits a state of silence (no sound) and which one of stereo sound and monaural sound the data represents.

Discrimination of a silence period may be performed in the following manner. For example, a level of an audio signal inputted is detected, and it is determined that the audio signal is a silence period if the condition that the detected audio signal level is lower than a predetermined level which is considered as silence continues for more than a certain fixed time (for example, approximately several seconds).

On the other hand, discrimination between stereo sound and monaural sound may be performed, for example, by subtraction processing between audio signals for the L (left) channel and the R (right) channel. In particular, if the audio signal in question is a monaural audio signal, then since the audio signals for the L channel and the R channel are same as each other, if subtraction between them is performed, then a level proximate almost to 0 is obtained. Accordingly, when the level obtained by such subtraction is lower than a predetermined level, it may be determined that the audio signal is a monaural audio signal, but if the level is higher than the predetermined level, then it may be determined that the audio signal is a stereo audio signal.

In the recording and reproduction apparatus of the present embodiment, a discrimination result of a silence state and a, discrimination result between stereo and monaural signals are utilized for changing over between a stereo recording mode and a monaural recording mode as hereinafter described.

The system controller 21 is a microcomputer which controls the entire apparatus, and provides various instructions to the MD controller 11 so that operation control of the MD section may be executed by the MD controller 11. Upon recording or reproduction of the MD 90, the system controller 21 receives management information such as sub codes from the MD controller 11.

Meanwhile, in the CD section, for example, the system controller 21 directly performs operation control. The system controller 21 also performs operation controls of the FM/AM tuner section 61 directly.

It is to be noted that such a form of the control system as described above is a mere example, and for example, a CD controller which performs control of the CD side may be provided additionally. Or, the system controller 21 and the MD controller 11 may alternatively be formed as a single controller.

The operation section 19 includes a recording key, a reproduction key, a stop key, an AMS key, a search key, a dubbing key for setting of normal speed dubbing/high speed dubbing and other necessary keys such that they can be operated by a user so that reproduction/recording operations regarding the MD 90 and the CD 91 may be performed.

Further, the operation section 19 allows inputting of a character string for recording incidental data such as a track name onto the MD 90, a registration determination operation and a registration mode operation.

Furthermore, the operation section 19 can be operated also to perform selection of a channel by the FM/AM tuner section 61 or an operation regarding presetting of, for example, a reception frequency or the like.

Operation information from the operation section 19 is supplied to the system controller 21, and the system controller 21 controls the other components to execute required operations based on the operation information and an operation program.

It is to be noted that, though not shown in FIG. 1, the operation section 19 may additionally have, for example, a remote control operation function by an infrared remote commander.

A display section 20 performs a required displaying operation upon reproduction or recording of the MD 90 or CD 91. In particular, the display section 20 displays time information such as, for example, a total play time or an elapsed time upon reproduction or recording and other required information such as a track number, an operation state or an operation mode under the control of the system controller 21.

In the recording and reproduction apparatus of the present embodiment constructed in such a manner as described above, a MD playback operation, a MD recording operation, a CD playback operation, a dubbing operation from a CD onto a MD, a recording operation of a tuner audio signal onto a MD, and a recording operation of an external audio signal (audio data, an analog audio signal) onto a MD can be performed.

2. MD Track Format

A cluster format of recording data tracks of the magneto-optical disc (MD) 90 is described here.

Figure 2:
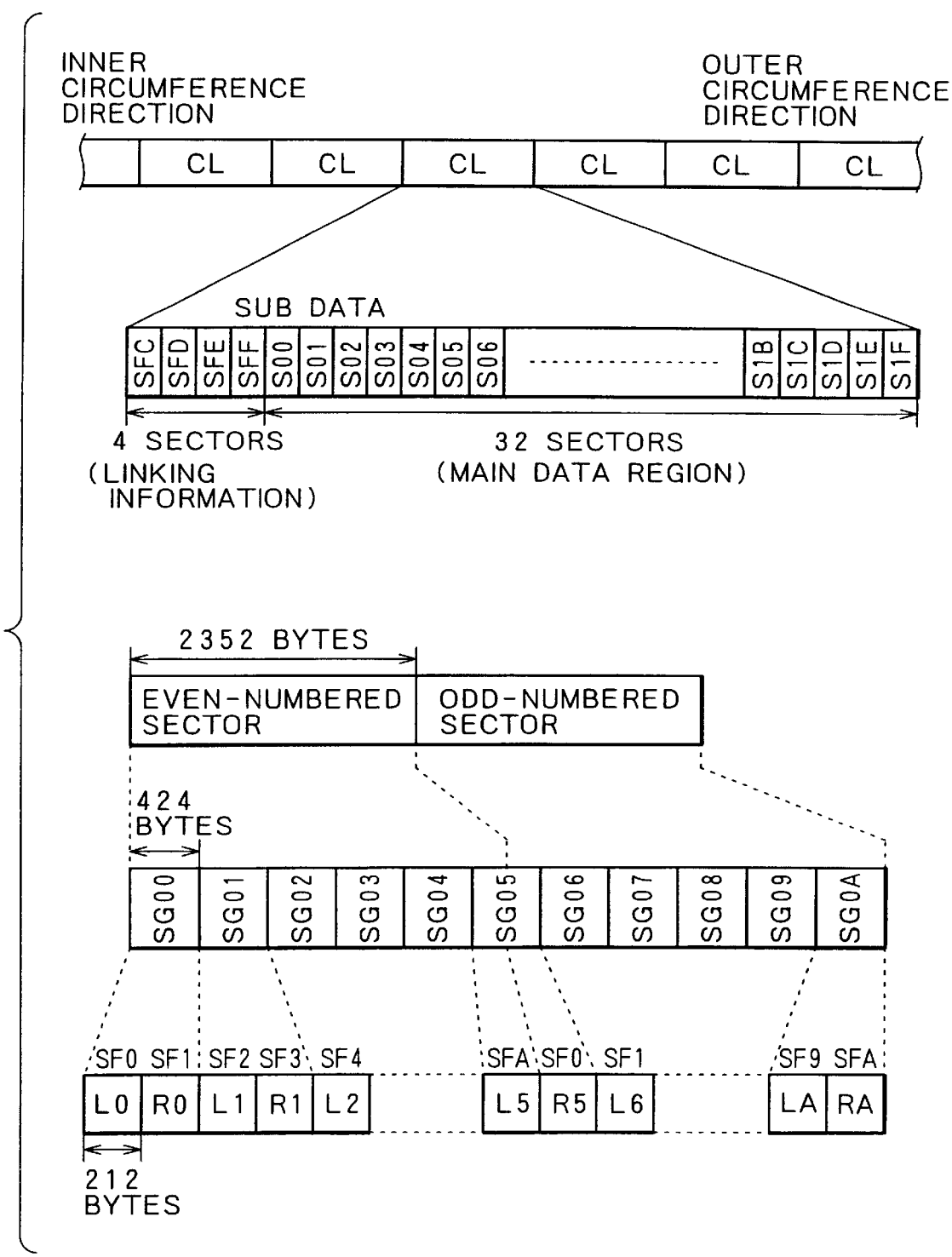
FIG. 2 is a diagrammatic view illustrating a cluster format of a mini disc system which may be incorporated in the combination apparatus of FIG. 1.

Recording operation of a mini disc system is performed in a unit called cluster, and the format of the cluster is shown in FIG. 2.

In a recording track in the mini disc system, clusters CL are formed successively as seen in FIG. 2, and one cluster makes a minimum unit upon recording. One cluster corresponds to 2 to 3 circumferential tracks.

Referring to FIG. 2, one cluster CL includes a sub data region of four sectors SFC to SFF and a main data region of 32 sectors S00 to S1F. The main data are, where they are data for an audio signal, audio data compressed by such ATRAC (Adaptive Transform Acoustic Coding) processing as described above.

As seen from FIG. 1, one sector is a unit of data including 2,352 bytes.

The sub data region of four sectors is used as a sub data area or a linking area, and TOC data, audio data and so forth are recorded in the main data region of 32 sectors. The sectors of the linking area are dummy sectors provided in order that, since the interleave length of the CIRC adopted in the recording and reproduction apparatus of the present embodiment is longer than the length of one sector (13.3 msec) adopted by a CD and so forth when error correction processing is performed, the difference between the interleave length and the one sector length may be absorbed, and are basically regarded as a reserved area. However, the sectors of the linking area may be used otherwise to record data for some processing or some control data.

It is to be noted that an address is recorded for each one sector.

One sector is further divided into units called sound groups. More particularly, two sectors are divided into 11 sound groups.

Mores specifically, as seen from FIG. 2, two successive sectors including an even-numbered sector such as the sector S00 and an odd-numbered sector such as the sector S01 include sound groups SG00 to SG0A. One sound group is formed from 424 bytes and includes an amount of audio data corresponding to the time of 11.61 msec.

Data are recorded separately for the L channel and the R channel in one sound group SG. For example, the sound group SG00 includes L channel data L0 and R channel data R0, end the sound group SG01 includes L channel data L1 and R channel data R1.

It is to be noted that 212 bytes which make a data region for the L channel or the R channel is called sound frame. The reproduction (recording) time of stereo sound corresponding to a sound frame of the L channel and the R channel in one sound group is 11.6 ms.

3. U-TOC

Such cluster formats as described hereinabove with reference to FIG. 2 are formed over an overall area of the magneto-optical disc (MD) 90. The magneto-optical disc (MD) 90 is divided radially into circumferential areas, and the radially innermost circumferential area is used as a management area while a program area is formed next to the management area.

It is to be noted that the innermost circumferential area of the disk includes a reproduction only area in which reproduction only data are recorded in the form of phase pits, and a magneto-optical area is formed next to the reproduction only memory and allows magneto-optical recording and reproduction. The management area thus includes the reproduction only area and an innermost circumferential portion of the magneto-optical area.

The program area is formed next to the management area of the magneto-optical area. In the program area, audio data is recorded on each sector as a main data area described hereinabove with reference to FIG. 3.

On the other hand, in the reproduction only area of the management area, a P-TOC (pre-mastered TOC) for management of the areas of the entire disk is provided. In the next management area in the magneto-optical area, table information (U-TOC; user table of contents) for management of programs (tunes and so forth) recorded in the program area is recorded.

Here, U-TOC sectors for management information to be used for management of recording/reproduction operation of the tracks (tunes and so forth) of the MD 90 are described.

FIG. 3 shows a format of the U-TOC sector 0.

It is to be noted that, as the U-TOC sectors of the MD 90, the sectors from the sector 0 up to the sector 31 can be provided. In other words, the sectors (S00 to S1F) of one cluster in the management area are used. The sector 1 and the sector 4 can be used as an area in which character information is to be recorded and the sector 2 is used as an area into which recording dates/hours are to be recorded.

The U-TOC sector 0 is a data area in which management information principally regarding tunes and so forth recorded by a user and free areas into which tunes can be recorded newly is recorded. In other words, in the sector 0, the start point (start address) and the end point (end address) of each of the programs recorded in the program area, and copy protect information as a characteristics of each program (track mode), emphasis information and so forth of each program are managed.

For example, if a user intends to record a certain tune onto the disc 90, then the system controller 21 searches out a free area on the disc 90 from the U-TOC sector 0 and controls to record audio data into the free area. On he other hand, upon reproduction from the MD 90, the system controller 21 discriminates an area in which a tune to be reproduced is recorded from the U-TOC sector 0, and accesses the area in which the tune to be reproduced is recorded to perform a reproduction operation.

As seen from FIG. 3, the U-TOC sector 0 has a header part in which a sync pattern is formed from 12 bytes. Next to the header part, data of 3 bytes ("Cluster H", "Cluster L" and "SECTOR") representative of an address of the sector, a maker code ("maker code") and a model code ("model code") indicative of a manufacturer of the disk, a first program number ("First TNO"), a last program number ("Last TNO"), a sector use situation ("used sectors"), a disk serial number ("disc serial No"), and a disk ID are recorded in the U-TOC sector 0.

Further, a correspondence table indication data section is recorded. The correspondence table indication data section includes a pointer P-DFA (Pointer for detective area) indicating the top position of slots into which detection position information produced on the disk is stored, another pointer P-FMPTY (Pointer for Empty slot) indicating a situation of use of slots, a pointer P-FRA (Pointer for Freely area) indicating the top position of slots for management of a recordable area, pointers P-TNO1, P-TNO2, . . . P-TNO255 individually indicating the top positions of slots corresponding to the individual programs.

The correspondence table indication data section is followed by a management table section in which 255 slots of 8 bytes are provided. Each of the slots is used for management of a start address, an end address, a track mode and link information.

The magneto-optical disk 90 described above need not necessarily have data recorded continuously thereon and may have a sequential data string recorded discretely (in a plurality of parts) thereon. It is to be noted that the term "part" signifies a portion in which successive data in time are recorded physically continuous clusters.

Thus, in the recording and reproduction apparatus (MD section of FIG. 1) on which the disk 90 is used, since data are stored once into the buffer memory 13 and the write rate and the readout rate into and from the buffer memory 13 are made different from each other, by causing the optical head 3 to successively access data discretely recorded on the disk 90 so that data are accumulated into the buffer memory 30, the data can be reproduced in a sequential data string on the buffer memory 13.

Even if the recording and reproduction apparatus of the present embodiment is constructed in such a manner as described above, since the write rate into the buffer memory 13 upon reproduction is set higher than the readout rate, the recording and reproduction apparatus can perform continuous audio reproduction.

With the recording and reproduction apparatus of the present embodiment, even if a second program shorter than a first program recorded already on a disk is overwritten on the first program, the recording capacity of the disk can be used efficiently by designating the remaining area on which the first program remains written without being erased as a recordable area (an area managed from the pointer P-FRA).

Figure 4:
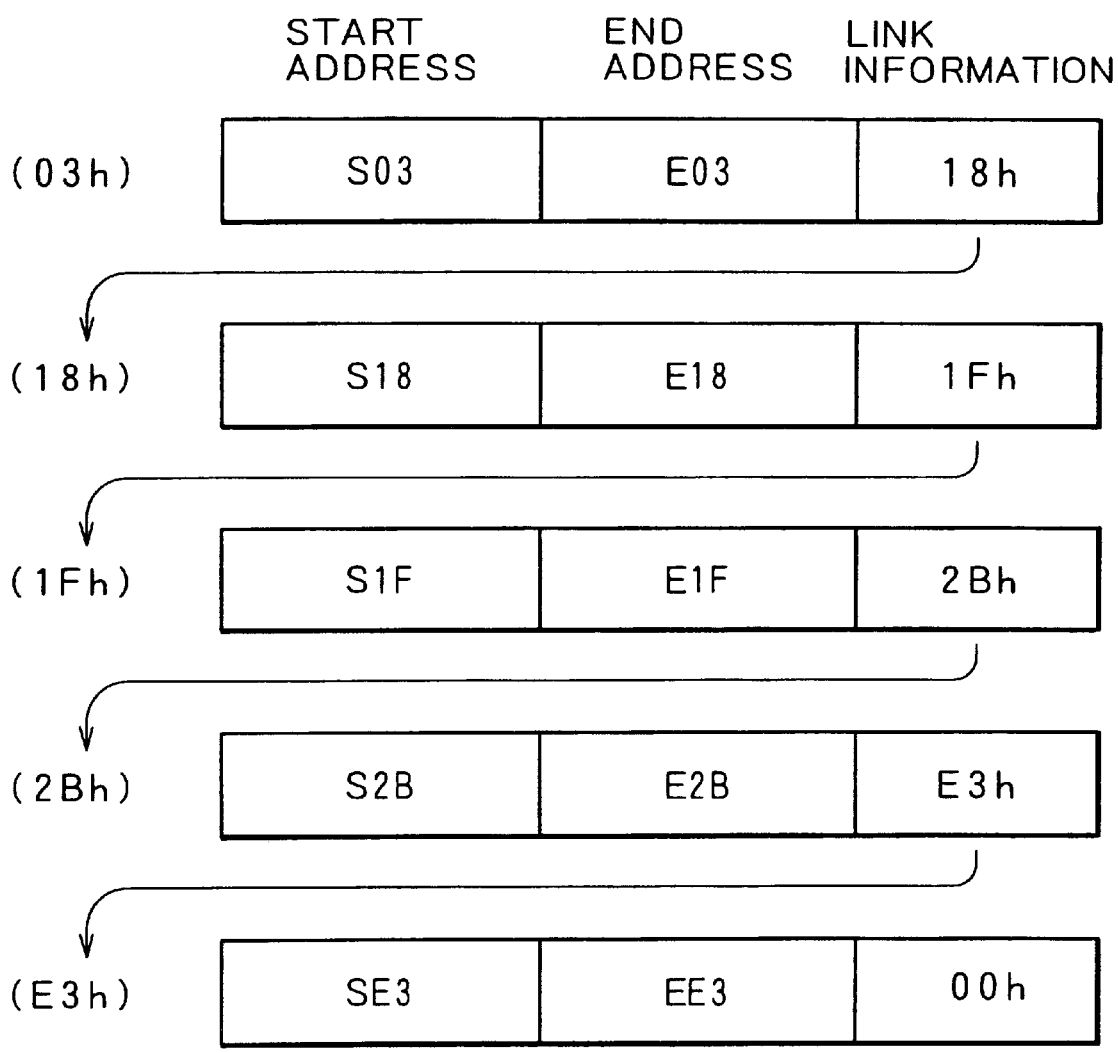
FIG. 4 is a diagrammatic view illustrating a form of a link provided by the U-TOC sector 0 of the mini disc system in the combination apparatus of FIG. 1.

A method of linking different areas present discretely on a disk using an example of the pointer P-FRA for management of recordable areas is described with reference to FIG. 4.

If it is assumed that, for example, a value 03h (hexadecimal) is recorded in the pointer P-FRA which indicates the top position of slots for management of the recordable areas, then the slot corresponding to this value "03h" is accessed subsequently. In other words, data of the slot 03h of the management table section is read in.

Data of the start address and the end address recorded in the slot 03h indicate the start point and the end point of one part recorded on the disk, respectively.

The link information recorded in the slot 03h indicates the address of a slot to be accessed next to the slot 03h. In FIG. 4, 18h is recorded as the link information.

Consequently, the slot 18h is accessed subsequently, and another part is grasped from the start address and the end address recorded in the slot 18h. Then, the slot 1Fh is accessed based on the link information of the slot 18h.

In this manner, the link information is successively traced similarly until the data "00h" as the link information appears while the addresses of all parts managed from the pointer P-FRA can be grasped.

By tracing slots until the link information of null (=00h) appears from the start point defined by a slot indicated by the pointer P-FRA as described above, parts recorded discretely on the disk can be linked on the memory. In this instance, all parts of the recordable areas on the disk 90 can be grasped.

While the manner of linking slots are described taking the pointer P-FRA as an example, also the pointers P-DFA, P-EMPTY, P-TNO1, P-TNO2, . . . , P-TNO255 are used similarly for management by linking different parts which are present discretely on the disk.

4. Stereo Recording Mode and Monaural Recording Mode

The MD section of the recording and reproduction apparatus of the present embodiment normally processes an audio signal inputted thereto as a stereo signal and records the audio signal onto a MD in a stereo mode. This is a stereo recording mode.

In addition, the MD section of the recording and reproduction apparatus of the present embodiment has a monaural recording mode in which it processes an audio signal inputted thereto as a monaural signal and records the audio signal onto a MD in a monaural mode.

Thus, different formats in the stereo recording mode and the monaural recording mode of the recording and reproduction apparatus of the present embodiment are described.

FIGS. 5A to 5C illustrate streams of audio data in a unit of a sound frame. Particularly, FIG. 5A illustrates recording of stereo data in the stereo recording mode.

In order to record stereo data in the stereo recording mode in such a manner as illustrated in FIG. 5A, as described hereinabove with reference to FIG. 2, audio data L0 ants R0 of the L channel and the R channel are placed into a sound frame SF-L for the L (left) channel (Lch) and a sound frame SF-R for the R (right) channel (Rch) in a certain one sound group. Then, also in a next one sound group SG, audio data L1 and R1 of the L channel and the R (channel are placed into sound frames SF-L and SF-R, respectively.

Monaural data may possibly be recorded in the stereo recording mode. In this instance, recording is performed, for example, in such a manner as illustrated in FIG. 5B.

In particular, the same monaural data MN0 and MN0 are stored into sound frames SF-L and SF-R in a certain one sound group SG. Then, monaural data MN1 and MN1 which follow the monaural data MN0 and MN0 time sequentially are placed into sound frames SF-L and SF-R in a next sound group SG.

When the data recorded in this manner is to be reproduced, for example, reproduction in a normal stereo mode is performed. In this instance, audio signals of the sound frames SF-L and SF-R in one sound group SG are outputted simultaneously. As a result, the audio signals can be outputted as monaural sound.

If recording is performed in such a manner as described above, even if sound reproduced is monaural sound, since the recording area size of the MD used for an audio signal for a unit time is same as that upon recording of stereo data, saving of the recording area cannot be achieved. In other words, the recordable time of the MD cannot be increased.

In the monaural recording mode, recording is performed in such a manner as illustrated in FIG. 5C.

In this instance, monaural data MN0 is first placed into a sound frame SF-L in a certain sound group SG in such a manner as seen in FIG. 5C. Then, into the following sound frame SF-R, monaural data MN1 which follows the monaural data MN0 time sequentially is placed. Into the sound frame SF-L of a next sound group SG, monaural delta MN2 which follows the monaural data MN1 is placed, and then into the following sound frame SF-R, monaural data MN3 which follows the monaural data MN2 is placed.

It can be seen that, where recording in the monaural recording mode is performed in this manner, the size of the area used to record an audio signal per certain unit time is reduced to ½ that in the stereo recording mode.

The reproduction time of stereo sound of the sound frames SF-L and SF-R of one sound group SG is 11.61 ms as described hereinabove with reference to FIG. 2. However, where the stereo sound is recorded in the monaural recording mode, since processing is performed such that data of the sound frames SF-L and SF-R in one sound group SG are successively reproduced along the time base, the reproduction time is 11.61 ms×2=23.22 ms and is thus increased to twice.

FIGS. 6A to 6F illustrate different formats in such stereo recording mode and monaural recording mode as described above in a unit of a cluster for comparison. Now, processing upon ending of recording in the monaural recording mode is described with reference to FIGS. 6A to 6F.

FIG. 6A illustrates recording, for example, of audio data in the stereo recording mode where the total cluster number is an even number. Here, it is assumed that recording is performed for six clusters from the cluster CL(N) to the cluster CL(N+5).

Here, for example, if the audio data is recorded in the monaural recording mode, then since the size of an area used for recording is equal to just ½ that in the stereo recording mode as it can be recognized from the description given hereinabove with reference to FIGS. 5A to 5C, for example, the data which is placed in the two successive clusters CL(N) and CL(N+1) of FIG. 6A in the stereo recording mode is placed, in the monaural recording mode, into just one cluster denoted as cluster CL(N) as seen in FIG. 6B. Thereafter, the data placed in the clusters CL(N+2) and CL(N+3) of FIG. 6A is placed into just one cluster denoted by cluster CL(N+1) of FIG. 6B, and the data placed in the clusters CL(N+4) and CL(N+5) of FIG. 6A is placed into just one cluster denoted by cluster CL(N+2) of FIG. 6B.

As a result, data of a size which uses an even number of clusters such as 6 clusters in the stereo recording mode uses an area size of just three clusters in the monaural recording mode, for example, as in the case just described.

On the other hand, where audio data is recorded in the stereo recording mode, if the audio data which uses such a size that the total cluster number is an odd number is recorded in the monaural recording mode, then recording proceeds in the following manner.

In FIG. 6C, it is illustrated that recording is performed into five clusters CL(N) to CL(N+4) in the stereo recording mode.

If the audio data which occupies the five clusters (that is, an odd number of clusters) is recorded in the monaural recording mode, then it is recorded in such a manner as illustrated in FIG. 6D.

In particular, the data which is placed in the two successive clusters CL(N) and CL(N+1) of FIG. 6C in the stereo recording mode is placed, in the monaural recording mode, into just one cluster denoted as cluster CL(N) as seen in FIG. 6D. Thereafter, the data placed in the clusters CL(N+2) and CL(N+3) of FIG. 6C is placed into just one cluster denoted by cluster CL(N+1) in FIG. 6D. Up to this point of time, the placement of data is similar to that described hereinabove with reference to FIGS. 6A and 6B.

In this instance, however, the audio data placed in the last cluster CL(N+4) illustrated in FIG. 6C cannot fully fill up the size of one cluster denoted by cluster CL(N+2) in FIG. 6D. In other words, the audio data placed in the cluster CL(N+4) is placed into a front half area of the cluster CL(N+2), and the remaining latter half area of the cluster CL(N+2) remains free without being filled with audio data. In short, if no countermeasure is taken, then the last cluster CL(N+2) remains having a size equal to one half the normal cluster size.

As hereinabove, the minimum recording data unit for a MD is a cluster, and conversely speaking, data of a size smaller than one cluster cannot be recorded onto a MD. Accordingly, data cannot be written onto a MD if it has, for example, the cluster size of the last cluster CL(N+2) shown in FIG. 6E.

Therefore, if the size of audio data to be placed into the last cluster in the monaural recording mode as described above is smaller than one cluster, then dummy data having a predetermined data pattern is filled into the remaining latter area of the one cluster which is not occupied by audio data so that the size of one cluster may be assured. It is to be noted that, upon reproduction signal processing of a cluster formed in such a manner as seen in FIG. 6F, the dummy data in the cluster is abandoned while the other real audio data is processed normally to regenerate a normal audio signal.

5. Recording Mode Changing Over Operation in the Present Embodiment 5-1. Outline Now, a recording mode changing over operation of the recording and reproduction apparatus of the present embodiment is described taking the description given above into consideration.

Where, for example, FM broadcasting is taken as an example, sound of a FM broadcast is normally stereo sound. However, for example, depending upon a tune, the sound of a FM broadcast is monaural sound because the sound source is a monaural sound source, or the sound of a FM broadcast changes over from stereo sound to monaural sound upon changing to narration or the like. Further, according to circumstances, a silence state may possibly continue for several seconds. Furthermore, even while, for example, a CD is being played back, tracks for stereo sound and tracks for monaural sound may possibly be present in a mixed state, and some silence period may possibly be present in a tune or between tunes (between tracks). In short, even where a single input source is involved, variation of a signal state may occur in this manner as the time passes.

Then, taking it into consideration that such a variation of the signal state as described above may be present, in the recording and reproduction apparatus of the present embodiment, for example, while a sound source (audio signal) is inputted and recorded onto a MD, the MD controller 11 detects the signal state of data written into the buffer memory 13 under the control of the memory controller 12. In this instance, the MD controller 11 detects, as a state of the data, which one of stereo data and monaural data the data is and whether or not the data is in a silence period of the data pattern.

Then, in the recording and reproduction apparatus, changing over between the stereo recording mode and the monaural recording mode is performed in the following manner during a recording operation in response to the result of the detection described above.

For example, in FIG. 7A, a variation of the signal state of an input source to be recorded is shown in accordance with passage of time. Here, it can be seen that the recording data is in a state of stereo data (audio data as a stereo signal) representing presence of sound within a period from t1 to t2. Where it is detected that the signal state is stereo sound in this manner, recording is performed in the stereo recording mode as seen in FIG. 7C. In this instance, recording of the track Tr#N is performed as seen from FIG. 7D.

Then, it is assumed that, at a certain timing after time passes in this state, the signal state changes from the stereo signal state to the monaural signal state, for example, as seen from the period from t2 to t3 in FIG. 7A. Alternatively, it is assumed that, while the signal state remains in the stereo sound, a signal state of a silence period appears.

In this state, recording in the stereo recording mode till then is ended, and recording in the monaural recording mode is switchably entered.

Meanwhile, the format of a MD is prescribed such that a portion or portions in which data is recorded in the stereo recording mode and another portion or portions in which data is recorded in the monaural recording mode must not be included in a mixed state in one track. Thus, when the recording mode is changed over in this manner, at the point t2 of time when recording in the preceding stereo recording mode comes to an end as seen in FIG. 7B, also recording of the track Tr#N is ended, and after the point t2 of time, the track number is managed as Tr#N+1 and recording is performed onto the track Tr#N+1. In other words, track changing is performed.

Then, for example, within the period from t3 to t4, if the signal state changes from the monaural signal state or silence signal state to the signal state of stereo sound in which sound is present, then the mode is changed over from the monaural recording mode till then to the stereo recording mode and recording is performed in the stereo recording mode. Also in this instance, at the point t3 of time, recording of the track Tr#N+1 till then is ended, and the track is changed over newly to the track Tr#N+2 and recording is started for the track Tr#N+2.

In FIG. 7B, a sequence of recording data (a data stream) in a unit of a cluster is illustrated. From FIG. 7B, it can be seen that, after each period at which the recording mode is changed over in response to the signal state (periods from t1 to t2, from t2 to t3, from t3 to t4), writing of data in a unit of a cluster is performed.

If it is assumed that the structure of the last cluster within the period from t2 to t3 within which recording is performed in the monaural recording mode is such as, for example, described hereinabove with reference to FIG. 6E, then dummy data is added to form a cluster unit as described hereinabove with reference to FIG. 6F and recording onto the MD is performed with the resulting cluster.

Actually, however, if it is impossible to form the full cluster size from audio data even for the last cluster when recording is performed in the stereo recording mode as in, for example, the period from t1 to t2 or the period from t2 to t3, then dummy data is added to form a cluster unit.

Conventionally, for example, if recording is started in the stereo recording mode, then recording is thereafter continued in the stereo recording mode until the recording comes to an end. This signifies that, even if the signal state of a recording source is, for example, the monaural signal state or silence state, recording is performed with the recording format (refer to FIGS. 5A and 5B) of the stereo recording mode.

In other words, it is signified that, even if the signal state is the monaural signal state, as recording is performed in the recording format for the stereo recording mode, a recording capacity equal to twice that upon recording in the monaural recording mode is consumed within the period. Further, that recording in the stereo recording mode is performed signifies that it is intended to record a source of stereo sound so that the quality as stereo sound may be maintained. However, for example, within a silence period, for example, even if this is included in a stereo sound period, the quality as stereo sound need not be maintained, and the silence may be recorded as monaural sound.

Therefore, in the recording and reproduction apparatus of the present embodiment, if the signal state of a recording source is the monaural sound state or silence state, then the recording mode is automatically changed over to the monaural recording mode to perform recording in such a manner as seen in FIGS. 7A to 7D so that, within the period, recording of an audio signal of the same unit time can be performed with a data use amount equal to ½ that in the stereo recording mode. Accordingly, where the recording capacity of the entire MD is considered, the recordable time can be increased when compared with that when, for example, the entire recordable area is recorded in the format for the stereo recording mode. In short, even where the MD is for the nominal recording time of 74 minutes, it allows recording for a time longer then 74 minutes.

In the recording and reproduction apparatus of the present embodiment, with regard to stereo sound, since it is recorded in the stereo recording mode, a portion of the stereo sound in which stereo sound is present is recorded with the quality of the stereo sound.

By the way, as described hereinabove, when the recording mode is changed over by automatic recording mode changing over recording of the recording and reproduction apparatus of the present embodiment, track changing is performed incidentally. Further, as it can be seen from the format of the sector 0 of the U-TOC described hereinabove with reference to FIG. 3, the maximum track number which can be managed by the MD system is 255. In other words, tracks of the track numbers from Tr#1 to Tr#255 can be managed.

Therefore, for example, if changing over of the signal state of a certain recording source between stereo sound and monaural sound or between stereo sound in which sound is present and a silence period is performed frequently, there is the possibility that the track number may reach 255 during recording.

An example of such a recording situation as just described is illustrated in FIGS. 8A to 8C. In FIG. 8A, the state of a recording source is illustrated in accordance with passage of time, and in FIG. 8B, a track number is shown. In FIG. 8C, a recording mode is illustrated.

In FIGS. 8A to 8C, since the recording source is stereo data within the period from t1 to t2 of FIG. 8A, recording is performed in the stereo recording mode as seen from FIG. 8C. It is assumed that, within the period from t1 to t2, a recording of the track Tr#254 is performed as seen from FIG. 8B. In other words, at the present point of time, recording of 254 tracks have been completed, and only one track remains as a recordable track.

Then, if it is assumed that the recording source changes to monaural data (or silence) at the point t2 of time, then the recording mode changes over to the monaural recording mode, and thereupon, track changing is performed. In other words, recording onto the track Tr#255 is started. This track Tr#255 is the last manageable track, and thereafter, no track changing is performed.

Then, it is assumed that, at the timing of the point t3 of time later than the point t2 of time, the recording source changes over to stereo data. In this instance, however, since the track being recorded at present is the track Tr#255, no track changing can be performed later. In other words, this signifies that also changing over of the recording mode cannot be performed later.

Accordingly, also later than the point t3 of time, recording of the track Tr#255 in the monaural recording mode is continued. As a result, stereo data inputted later than the point t3 of time is recorded as monaural data onto the MD.

When the monaural recording mode is entered at the track Tr#255 in this manner, even if the recording source is stereo data, the data is recorded only as monaural sound. This signifies that, upon reproduction, the data is reproduced only as monaural sound.

The automatic recording mode changing over recording of the recording and reproduction apparatus of the present embodiment is designed so as to make the recordable time of a MD as long as possible while recording of stereo sound of the MD is maintained. However, when actual use is considered, it is preferable to record data of stereo sound preferentially so that it may remain in the form of stereo sound.

Therefore, in the automatic recording mode changing over recording of the recording and reproduction apparatus of the present embodiment, the rule upon recording is narrowed in such a manner as described below so that the 255th track (the last track which corresponds to the maximum manageable track number) may not be recorded in the monaural recording mode in order that data to be recorded onto a MD in a recording source portion which is stereo sound may be recorded as stereo sound.

Herds, as shown in FIG. 9B, it is assumed that, when the track Tr#253 (the third last track) is recorded within the period from t1 to t2, the signal state of the recording source then is monaural data (or silence) as seen from FIG. 9A, and consequently, the monaural recording mode is set as seen in FIG. 9C.

Then, if it is assumed that the recording source changes over from monaural sound to stereo sound at the point t2 of time, then the recording mode is changed over to the stereo recording source as seen in FIG. 9B. Simultaneously, track changing is performed so that the recording track is changed to the track Tr#254 which directly precedes the manageable last track.

Then, if the state wherein the track Tr#254 is recorded in the stereo recording mode is entered in this manner, then later changing over of the recording mode and incidental track changing are inhibited.

Then, for example, if the recording source changes from stereo data to monaural data as at the point t3 of time of FIG. 9A, recording of the track Tr#254 in the stereo recording mode is continued.

By adopting the rule just described, the substantial last track becomes the track Tr#254, and thereafter, recording is performed in the stereo recording mode. Consequently, a stereo sound portion of the recording source is recorded as stereo sound. Conversely speaking, as the monaural recording mode is set at the track Tr#255 (last track) as described hereinabove with referenced to FIGS. 8A to 8C, recording of stereo sound as monaural sound can be prevented.

On the other hand, if, for example, recording of stereo data of the track Tr#253 is performed in the stereo recording mode within the period from t1 to t2 of FIGS. 10A to 10C and then the recording source changes over to monaural data (or silence) within the next period from t2 to t3 so that the track Tr#254 is recorded in the monaural data, then, for example, if the recording source changes over to stereo sound at the point t3 of time, then track changing is performed so that recording of the track Tr#255 is performed in the stereo recording mode.

In this instance, since the tracks up to the track Tr#255 corresponding to the manageable maximum track number are used up, even if the recording source changes over to monaural data (or silence), for example, at the point t4 of time later than the point t3 of time, the operation of recording the track Tr#255 in the stereo recording mode is continued. In other words, in the case illustrated in FIGS. 10A to 10C, the last track does not allow achievement of saving of the recording time because a recording source is recorded as stereo sound even if it is monaural sound. However, it is assured that any stereo sound portion of the recording source is recorded as stereo sound.

5-2. Processing Operation

Subsequently, processing operation for realizing a recording operation as the automatic recording mode changing over recording of the recording and reproduction apparatus of the present embodiment described above is described with reference to a flow chart of FIG. 11. It is to be noted that the processing illustrated in FIG. 11 is executed by the MD controller 11, and the recording signal processing is executed in parallel to the operation of writing audio data compressed by the encoder/decoder section 14 into the buffer memory 13 so that it may be stored in the buffer memory 13.

Figure 11:
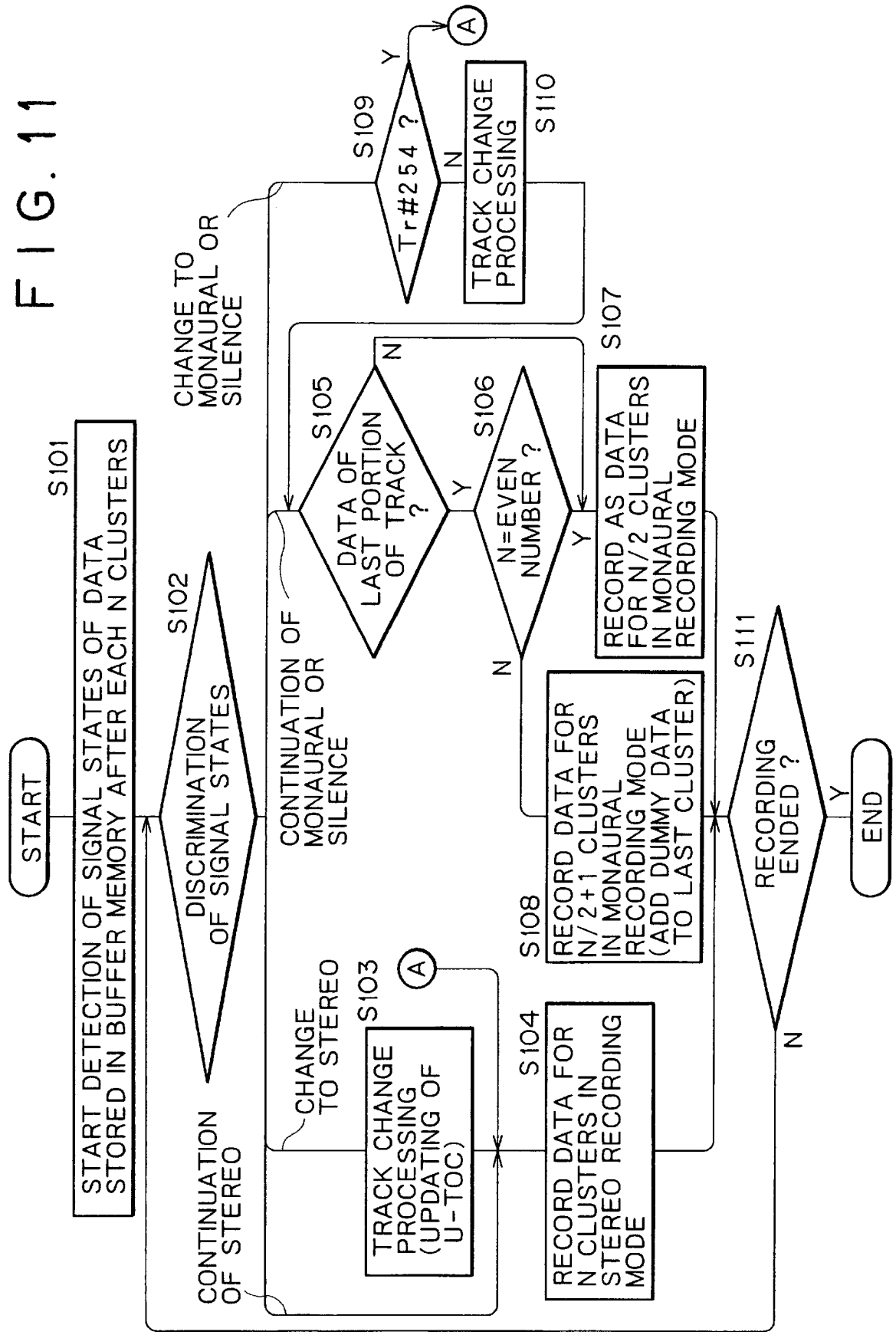
FIG. 11 is a flow chart illustrating processing operation for automatic recording mode changing over recording.

In the processing illustrated in FIG. 11, first in step S101, processing of detecting a signal state of data which has been compressed by the encoder/decoder section 14 and written into and stored in the buffer memory 13 as an audio signal is started. The signal state here is whether or not the recording source is either stereo sound or monaural sound or silence as described hereinabove, and also a variation of the signal state is detected.

Further, the detection of the signal state here is performed for data of each N clusters where N is a predetermined maximum number set in advance. The maximum number N here is set as an even number.

Here, data in a stage wherein it is stored in the buffer memory 13 is used as an object of processing. Consequently, operation of fetching data through the memory controller 12 and detecting a signal state of the data can he preformed, for example, by processing of the MD controller 11 itself. Therefore, it is not particularly necessary to provide functioning circuits for detection between stereo/monaural sound and for detection of a silence period, for example, in the analog audio signal inputting stage and the digital audio signal inputting stage. Consequently, while a circuit construction substantially similar to a conventional circuit construction is employed, detection of a signal state can be performed by a simple construction as much.

Further, for example, in the case of the combination apparatus shown in FIG. 1, the FM/AM tuner section 61 itself can be constructed such that it can discriminate based on a signal processing situation upon reception demodulation which one of stereo sound and monaural sound the output sound is. Accordingly, the FM/AM tuner section 61 can be constructed also such that it outputs an identification signal representative of which one of stereo sound and monaural sound the output sound thereof is.

Thus, where the outputting section of the recording source can output a stereo/monaural identification signal, the MD controller 11 can be constructed such that it receives the identification signal directly (or indirectly, for example, through the system controller 21) and performs discrimination between stereo sound and monaural sound based on the thus received identification signal.

Then in next step S102, the MD controller 11 discriminates a signal state of the data for N clusters supervised by the processing in step S101 described above.

It is to be noted that, although the discrimination is usually performed based on a result of detection regarding data for N clusters as the maximum number if the signal state does not exhibit a variation, if a variation of the signal state from stereo data to monaural data or silence or vice versa is detected while data of the number of clusters less than N is detected, then a discrimination result regarding the data of the number of clusters less than N is outputted. In this instance, the cluster number N may possibly be an odd number.

If it is detected in step S102 that the data for N clusters for which the supervision has been performed in the present cycle is stereo data same as stereo data which was detected in the preceding cycle, then the processing advances as it is to step S104.

On the contrary if it is detected in step S102 that the data for N clusters in the present cycle is stereo data changed from, for example, monaural data or silence which was detected in the preceding cycle, then the processing advances to step S103.

In step S103, processing for track changing is performed. To this end, the MD controller 11 performs writing into a U-TOC sector in response to a result of the recording regarding the recording track for which recording has been performed till then based on contents of the U-TOC sector 0 read out from the MD and stored, for example, in the buffer memory 13 (or the internal RAM of the MD controller 11), and executes writing so as to set a new recording track onto which recording is to be performed.

Then in next step S104, the MD controller 11 executes control so that recording signal processing for the recording data for N clusters onto the MD and a recording operation onto the MD may be obtained in the stereo recording mode.

Here, if the processing has advanced to step S104 based on the discrimination in the preceding step S102 that stereo data appears continuously to preceding data, then the stereo data for N clusters is recorded next to the preceding stereo data within the same recording track.

On the other hand, if it is discriminated in step S102 that the data for N clusters in the present cycle is monaural data or silence which follows the preceding data in the form of monaural data or silence, then the processing advances to step S105.

In step S105, it is discriminated that the data for N clusters discriminated in the present cycle is data of the last portion of a monaural data portion or a silence period. This discrimination can be performed based on a result of discrimination, for example, of the detection processing of the signal state started after the processing in step S101, whether or not the data next to the data for N clusters discriminated in the present cycle exhibits a change to stereo data which exhibits presence of sound.

If a negative result is obtained in step S105, then the processing advances to step S107, but if an affirmative result is obtained, then the processing advances to step S106.

Here, when a negative result is obtained in step S105, the cluster number N discriminated in the present cycle is the maximum number set in advance and accordingly is an even number. On the other hand, when an affirmative result is obtained, the cluster number N may possibly be an even number or an odd number.

Therefore, in step S106, it is discriminated whether or not the cluster number N discriminated in the present cycle is an even number. Then, if an affirmative result that the cluster number N is an odd number is an obtained, then the processing advances to step S107. However, if it is discriminated that the cluster number N is an odd number and consequently a negative result is obtained in step S106, then the processing advances to step S108.

In step S107, the MD controller 11 executes control processing for causing the data for the N clusters discriminated as monaural data or silence in the present cycle to be recorded as data of the size equal to N/2 clusters in the monaural recording mode onto the MD. In short, the MD controller 11 causes a recording operation to be executed in the monaural recording mode for an even number of clusters as described hereinabove with reference to FIGS. 6A and 6B.

On the other hand, in step S108, the MD controller 11 executes processing for causing a recording operation to be executed in the monaural recording mode for an odd number of clusters described hereinabove with reference to FIGS. 6C to 6F.

In short, the MD controller 11 causes signal processing to be executed so that the data for N clusters discriminated as monaural data or silence in the present cycle may be data for N/2+1 clusters. Thereupon, dummy data is added to a free area of the last cluster to secure the size of one cluster for the last cluster. Then, the MD controller 11 causes the data for the N/2+1 clusters obtained in this manner to be written onto the MD.

On the other hand, if it is discriminated in step S102 that the data for N clusters in the present cycle is monaural data or data of a silence period changed, for example, from stereo data detected in the preceding cycle, then the processing advances to step S109.

It is discriminated in step S109 whether or not the recording track when the data preceding to the data for N clusters for which the discrimination is performed in the present cycle is the track Tr#254. In other words, it is discriminated whether or not recording is performed for the second last track as a track which can be set as a recordable track.

If it is discriminated in step S109 that the recording track when the preceding data is recorded is not the track Tr#254, that is, the recording track has the track number equal to or smaller than the track number Tr#253, then the processing advances to step S110. In step S110, track changing processing similar to that executed in step S103 described hereinabove is executed, whereafter the processing advances to step S105. Here, the reason why the processing returns to step S105 is that there is the possibility that only the data for N clusters which has been discriminated to be monaural data or silence newly in the present cycle may make data for the last portion of the track.

On the other hand, if it is discriminated in step S109 that the recording track when the preceding data is recorded is the track Tr#254, then the processing advances to step S104. By the processing of advancement from step S109 to step S104, the operation later than the point t3 of time described hereinabove with reference to FIGS. 9A to 9C is realized. In particular, since the stereo recording mode is set for the track Tr#254, an operation of inhibiting later changing over of the recording mode and incidental track changing so that the stereo recording mode is maintained to perform recording of the data is executed.

After the control processing for writing onto the MD in step S104, S108 or S107 described hereinabove is ended, it is discriminated whether or not recording should be ended in step S111. If it is discriminated that recording should not be ended, then the processing returns to step S102 so that the processing in response to a result of discrimination of a signal state described hereinabove is repeated. In other words, the automatic recording mode changing over recording of the recording and reproduction apparatus of the present embodiment is continued.

On the other hand, for example, if a recording ending operation is performed by a user or the recording remaining amount of the MD is used up and recording should be ended, an affirmative result is obtained in step S111, and the processing goes out of the present routine.

By the way, depending upon the processing described above, for example, upon starting of recording, a recording mode is automatically set based on a result of discrimination regarding a signal state inputted then. In other words, with the recording and reproduction apparatus of the present embodiment, the user need not necessarily perform an operation for setting a recording mode or the like prior to starting of recording.

It is to be noted that, as described hereinabove, when recording is being performed for the track Tr#255 corresponding to the manageable maximum track number, changing over of the recording mode is not performed because track changing is not performed any more. Therefore, although description with reference to a flow chart or the like is omitted herein, when track changing is performed from the track Tr#255, the processing may go out of the process illustrated in FIG. 11 so that recording in a normal stereo recording mode should be continued until recording is ended.

Further, in the recording and reproduction apparatus of the present embodiment, it is only required to discriminate a signal state (stereo or monaural, silence) and perform the automatic recording mode changing over operation described hereinabove with reference to FIGS. 5A to 10C based on a result of the discrimination. Therefore, the actual processing operation need not be limited to that described hereinabove with reference to FIG. 11.

Further, while the recording and reproduction apparatus of the present embodiment is described taking a MD recorder/player wherein it is integrated with a CD player and a radio set as an example, the recording apparatus of the present invention may be formed, for example, as a sole MD recorder/player.

Furthermore, the present invention can be applied to a recording apparatus ready for a disk medium such as, for examples a DVD (Digital Versatile Disk or Digital Video Disk) or a hard disk other than a MD recorder/player or any other recording apparatus which is ready for any other recording medium than a disk medium such as, for example, a semiconductor memory only if the medium has a format with which the recording data amount of a sources signal in the same unit time is different, for examples, between stereo recording and monaural recording.

In addition, while the recording and reproduction apparatus of the present embodiment is described above taking automatic changing over between recording modes for 2-channel stereo data and monaural data (1 channel) as an example, for example, the channel number is not limited to the relationship of 2 channels and 1 channel. In other words, the present invention can be applied also where a recording format for a medium has recording modes, for example, for a 4-channel source and a 2-channel source. Further, the present invention can be applied also where automatic changing over among three or more recording modes such as, for example, recording modes corresponding to 4-, 2- and 1-channel sources is performed.

As described above, with the recording apparatus of the present invention, a signal state of an input signal is discriminated during recording operation, and a recording mode which relates to the number of recording channels is changed over in response to a result of the discrimination.

For example, in a conventional recording apparatus, changing over of a recording mode (changing of the number of recording channels) is set before starting of recording by a user, and such changing over is not performed during recording operation. In contrast, with the recording apparatus of the present invention, changing over to a recording mode which is considered to be appropriate can be performed automatically in response to a signal state of a recording source. Consequently, even if a user does not perform a setting operation in advance, an appropriate recording mode is set in response to the signal state. Further, merits which can be obtained by each recording mode can be made most of.

For example, if the recording source is an audio signal, then it is discriminated whether or not the signal is a multi-channel stereo signal or a monaural signal. If the signal is a multi-channel stereo signal, then a recording mode in which recording based on the number of channels is to be performed can be set, but if the signal is a monaural signal, then another recording mode wherein recording based on one channel is to be performed can be set.

Since such a mode setting operation as just described is performed automatically during recording, for example, where such a recording format that the data size of sound per unit time varies depending upon the recording mode (channel number) is adopted, the recordable time of a recording medium can be made longer than that where recording is performed only in a recording mode which corresponds to a multi-channel stereo signal. In this instance, since, for multi-channel stereo sound, a recording mode corresponding to the number of channels is set, the quality of the stereo sound is maintained.

Further, with the recording apparatus of the present invention, it is possible to discriminate whether or not the audio signal of the recording source is in a sound presence state or a sound absence state, that is, a silence state, and set, when the audio signal is in a sound presence state, a recording mode, for example, for a certain number of channels, but set, when the audio signal is in a silence state, another recording mode for a predetermined number of channels smaller than the number of channels for the sound presence state.

For example, even when multi-channel sound is obtained, a silence period included in the period of the multi-channel sound presents, from the point of view of reproduction sound, no sound in whichever recording mode it has been recorded. Therefore, if the recording mode for the predetermined number of channels smaller than that for the sound presence state is set for the silence state, then it is possible to assure the quality of multi-channel stereo sound and besides increase the recordable time by a time corresponding to the total time of silence periods involved similarly as described above.

Further, with the recording apparatus of the present invention, the number of channels of channel data units (sound frames) to be arranged, for example, time divisionally in a recording data unit (cluster) of a fixed length is different depending upon the number of recording channels among different recording modes. In particular, the number of channels of sound frames within a recording data unit is varied in response to changing over of the recording mode. This signifies that, where the recording source is sound, as the number of channels of sound frames in a recording data unit decreases, the outputting time of sound which can be recorded within one recording data unit increases.

Then, where discrimination of the signal state of the signal source is performed and the appropriate recording mode is changed over in response to a result of the discrimination, recording operation which makes effective use of a plurality of recording modes prepared in advance can be performed. For example, where the recording source is an audio signal, it is possible to save the recordable capacity described above, that is, to increase the recordable time. Also in this instance, even if the user does not particularly perform a setting operation, an appropriate recording mode can be set automatically in response to the signal state.

Where the recording apparatus has the construction just described, for example, when the recording mode is changed over, the last recording data unit for which recording is performed in the recording mode prior to such changing over is formed from signal data of the recording source and a predetermined kind of data different from the signal data. By the measures just described, for example, even if the size of the signal data of the recording source to be included in the last recording data unit is smaller than the size of one recording data unit and a free area appears in the last recording data unit, it is possible, for example, to add dummy data to the free area to assure one recording data unit for the last recording data unit. In short, irrespective of changing over of the recording mode, data can be successively recorded onto the recording medium appropriately.

Further, in order to discriminate the signal state of the recording source, detection is performed in a stage in which the signal data of the input source is written into a buffer memory (data storage means) to discriminate the signal state. Consequently, for example, if the recording source is an audio signal, then there is no necessity to particularly provide a functioning circuit section for detection of the signal state in the inputting stage of the audio signal. Consequently, the construction for detection of the signal state can be simplified as much.

Further, in a system which has a format wherein a program (track) is updated and managed in response to changing over of the recording mode, if a certain particular recording mode is set when recording is performed while programs up to the program number N−1 smaller by one than the maximum program number N which can be managed are used already, then later changing over of the recording mode and incidental program changing are not performed.

Consequently, for example, particularly when recording of a source as an audio signal is proceeding, if recording is performed in a recording mode for stereo sound whiles programs up to the program number N−1 are already used, then even if the signal changes over to monaural sound later, track changing incidental to later changing over of the recording mode can be prevented.

Where the recording apparatus is constructed in such a manner as just described, such a disadvantage that, for example, a recording mode for monaural sound is set for the last program corresponding to the maximum program number and an audio signal for stereo sound is recorded as a monaural signal thereafter can be eliminated.

While a preferred embodiment of the present invention has been described using specific terms, such description is for illustrative purposes only, and it is to be understood that changes and variations may be made without departing from the spirit or scope of the following claims.

What is claimed is:

1. A recording apparatus for recording a signal onto a recording medium, comprising:
   recording means for recording the signal onto the recording medium in accordance with one of recording modes selected from within a plurality of recording modes;
   signal discrimination means for discriminating a signal state of the signal; and
   changeover control means for changing over the recording mode of said recording means in response to a result of the discrimination by said signal discrimination means.

2. A recording apparatus according to claim 1, wherein said signal discrimination means discriminates the number of channels of the signal, and said changeover control means changes over the recording mode of said recording means in response to the number of channels discriminated by said signal discrimination means.

3. A recording apparatus according to claim 2, wherein said signal discrimination means discriminates whether the signal is a first signal or a second signal which has the number of channels smaller than that of the first signal, and said changeover control means changes over the recording mode of said recording means to a recording mode in which recording of the number of channels of the first or second signal is performed in response to a result of the discrimination by said signal discrimination means.

4. A recording apparatus according to claim 3, wherein said signal discrimination means discriminates whether the signal is a stereo signal or a monaural signal, and said changeover control means changes over the recording mode of said recording means to a first recording mode in which recording of 2 channels is performed when a result of the discrimination is the stereo signal, but to a second recording mode in which recording of 1 channel is performed when the result of the discrimination is the monaural signal.

5. A recording apparatus according to claim 1, wherein said signal discrimination means discriminates whether or not the signal represents silence, and if it is discriminated by said signal discrimination means that the signal represents silence, said changeover control means changes over the recording mode of said recording means to a recording mode to be used for recording of a signal of the least number of channels from within the plurality of recording modes.

6. A recording apparatus according to claim 5, wherein said changeover control means changes over the recording mode of said recording means to a recording mode for a single channel from within the plurality of recording nodes when it is discriminated by said signal discrimination means that the signal represents silence.

7. A recording apparatus for blocking a signal for each predetermined length and recording resulting blocks onto a recording medium, comprising:

recording means for recording the signal onto the recording medium in accordance with a recording mode selected from within a plurality of recording modes;

signal discrimination means for discriminating a signal state of the signal; and changeover control means for changing over a recording mode of said recording means between a first recording mode in which a first signal is recorded into each of the blocks which is a recording unit onto the recording medium and a second recording mode in which a second signal having the number of channels smaller than that of the first signal is recorded into any of the blocks in response to a result of the discrimination by said signal discrimination means.

8. A recording apparatus according to claim 7, further comprising control means for controlling said recording means so that, when a rear half portion of one of the blocks becomes a free area when the first signal having the number of channels smaller than that of the first signal is recorded into the block, predetermined data is recorded into the free area.

9. A recording apparatus according to claim 7, wherein said signal discrimination means discriminates whether the signal is a stereo signal or a monaural signal, and said changeover control means changes over the recording mode of said recording means to a first recording mode in which recording of 2 channels is performed when a result of the discrimination is the stereo signal, but to a second recording mode in which recording of 1 channel is performed when the result of the discrimination is the monaural signal.

10. A recording apparatus according to claim 7, wherein said signal discrimination means discriminates whether or not the signal represents silence, and if it is discriminated by said signal discrimination means that the signal represents silence, said changeover control means changes over the recording mode of said recording means to the second mode.

11. A recording apparatus according to claim 10, wherein said changeover control means changes over the recording mode of said recording means to a recording mode for a single channel from within the plurality of recording modes when it is discriminated by said signal discrimination means that the signal represents silence.

12. A recording apparatus for recording a signal onto a recording apparatus on which n programs can be managed, n being a natural number greater than 1, comprising:

recording means for recording, in accordance with a recording mode selected from within a plurality of recording modes, the signal as a new program onto the recording medium each time the recording mode is changed over;

signal discrimination means for discriminating a signal state of the signal; and changeover control means for changing over the recording node of said recording means in response to a result of the discrimination by said signal discrimination means;

wherein said changeover control means inhibits the changing over control when n−1 programs are managed on the recording medium and a particular one of the recording modes is set.

13. A recording apparatus according to claim 12, wherein said changeover control means inhibits the changing over control when n−1 programs are managed on the recording medium and one of the recording modes which corresponds to a plural number of channels is set.

14. A recording apparatus according to claim 13, wherein said changeover control means inhibits the changing over control when n−1 programs are managed on the recording medium and one of the recording modes which corresponds to a stereo signal is set.

15. A recording apparatus according to claim 12, wherein said changeover control means permits, when n−1 programs are managed on the recording medium and it is discriminated by said signal discrimination means that the signal state has changed from a first signal of a predetermined number of channels to a second signal of the number of channels greater than that of the first signal, the changing over control to the recording mode which corresponds to the second signal.

16. A recording method for recording a signal onto a recording medium, comprising the steps of:

recording the signal onto the recording medium in accordance with one of recording modes selected from within a plurality of recording modes;

discriminating a signal state of the signal; and changing over the recording mode in response to a result of the discrimination.

17. A recording method for blocking a signal for each predetermined length and recording resulting blocks onto a recording medium, comprising the steps of:

recording the signal onto the recording medium in accordance with a recording mode selected from within a plurality of recording modes;

discriminating a signal state of the signal; and changing over a recording mode between a first recording mode in which a first signal is recorded into each of the blocks which is a recording unit onto the recording medium and a second recording mode in which a second signal having the number of channels smaller than that of the first signal is recorded into any of the blocks in response to a result of the discrimination.

18. A recording method for recording a signal onto a recording apparatus on which n programs can be managed, n being a natural number greater than 1, comprising the steps of:

recording, in accordance with a recording mode selected from within a plurality of recording modes, the signal as a new program onto the recording medium each time the recording mode is changed over;

discriminating a signal state of the signal; and changing over the recording mode in response to a result of the discrimination;

wherein the changing over step inhibits the changing over control when n−1 programs are managed on the recording medium and a particular one of the recording modes is set.

* * * * *

UNITED STATES PATENT AND TRADEMARK OFFICE
CERTIFICATE OF CORRECTION

PATENT NO. : 6,310,842 B1
DATED : October 30, 2001
INVENTOR(S) : Satoshi Higuchi Page 1 of 1

It is certified that error appears in the above-identified patent and that said Letters Patent is hereby corrected as shown below:

Column 3,
Line 10, change "nodes" to -- modes --.

Column 8,
Line 33, change "broad cast" to -- broadcast --.

Column 10,
Line 44, change "Mores" to -- More --; and
Line 53, change "end" to -- and --.

Column 11,
Line 61, change "detective" to -- defective --.

Column 13,
Line 27, change "(channel" to -- channel --; and
Line 57, change "delta" to -- data --.

Column 18,
Line 17, change "Herds," to -- Here, --.

Column 22,
Line 34, change "sources" to -- source --.

Signed and Sealed this

Ninth Day of April, 2002

Attest:

Attesting Officer

JAMES E. ROGAN
Director of the United States Patent and Trademark Office